US011448032B2

(12) United States Patent
Tran et al.

(10) Patent No.: US 11,448,032 B2
(45) Date of Patent: Sep. 20, 2022

(54) ADJUSTABLE FRACTURING SYSTEM

(71) Applicant: SPM Oil & Gas PC LLC, Fort Worth, TX (US)

(72) Inventors: Duc Thanh Tran, Spring, TX (US); Matthew Thomas Robinson Webster, Edmonton (CA); Ray Dicksang Pang, Missouri City, TX (US); Keith Murdoch, Houston, TX (US)

(73) Assignee: SPM Oil & Gas PC LLC, Fort Worth, TX (US)

( * ) Notice: Subject to any disclaimer, the term of this patent is extended or adjusted under 35 U.S.C. 154(b) by 0 days.

(21) Appl. No.: 17/217,690

(22) Filed: Mar. 30, 2021

(65) Prior Publication Data

US 2021/0215014 A1    Jul. 15, 2021

Related U.S. Application Data

(63) Continuation of application No. 15/631,534, filed on Jun. 23, 2017, now Pat. No. 10,968,717.

(Continued)

(51) Int. Cl.
*E21B 33/068* (2006.01)
*E21B 33/038* (2006.01)
(Continued)

(52) U.S. Cl.
CPC ............ *E21B 33/068* (2013.01); *B01F 23/43* (2022.01); *B01F 27/05* (2022.01); *E21B 33/038* (2013.01); *E21B 43/26* (2013.01); *F04B 15/02* (2013.01); *F04B 23/04* (2013.01); *F04B 23/06* (2013.01); *F04B 47/00* (2013.01); *F16K 5/04* (2013.01);

(Continued)

(58) Field of Classification Search
CPC ....... E21B 33/068; E21B 33/038; E21B 43/26
See application file for complete search history.

(56) References Cited

U.S. PATENT DOCUMENTS

| 2,729,420 | A | 1/1956 | Schenck |
| 2,864,580 | A | 12/1958 | Lemoine |

(Continued)

FOREIGN PATENT DOCUMENTS

| CN | 103270241 A | 8/2013 |
| CN | 104685274 A | 6/2015 |
| CN | 105008033 A | 10/2015 |

OTHER PUBLICATIONS

International Search Report and Written Opinion re International Application No. PCT/US2017/039020, dated Nov. 6, 2017, 17 pages.

*Primary Examiner* — Aaron L Lembo

(57) ABSTRACT

A system for supplying fracturing fluid to a fracturing tree coupled to a wellhead comprising: a zipper module having a lower block with a first opening configured to receive the fracturing fluid, the lower block being independently rotatable at a swivel assembly around a vertical axis relative to the lower block; an upper block with a second opening configured to dispel the fracturing fluid, the upper block being independently rotatable at a swivel connection around the vertical axis; an internal flow path between the upper block and the lower block; and a fluid conduit between the zipper module and the fracturing tree comprising at least one pipe, wherein the at least one pipe defines a first straight flow path between the zipper module and the fracturing tree.

18 Claims, 15 Drawing Sheets

Related U.S. Application Data

(60) Provisional application No. 62/421,019, filed on Nov. 11, 2016, provisional application No. 62/412,230, filed on Oct. 24, 2016, provisional application No. 62/393,990, filed on Sep. 13, 2016, provisional application No. 62/354,101, filed on Jun. 23, 2016.

(51) Int. Cl.
| | |
|---|---|
| *E21B 43/26* | (2006.01) |
| *F04B 15/02* | (2006.01) |
| *F04B 23/04* | (2006.01) |
| *F04B 47/00* | (2006.01) |
| *B01F 23/43* | (2022.01) |
| *B01F 27/05* | (2022.01) |
| *F16K 5/04* | (2006.01) |
| *F16K 11/048* | (2006.01) |
| *F16K 31/126* | (2006.01) |
| *F04B 23/06* | (2006.01) |
| *F16L 41/03* | (2006.01) |
| *B01F 101/49* | (2022.01) |
| *F16K 5/00* | (2006.01) |
| *F16K 11/00* | (2006.01) |

(52) U.S. Cl.
CPC .......... *F16K 11/048* (2013.01); *F16K 31/126* (2013.01); *F16L 41/03* (2013.01); *B01F 2101/49* (2022.01); *F16K 5/00* (2013.01); *F16K 11/00* (2013.01)

(56) References Cited

U.S. PATENT DOCUMENTS

| | | |
|---|---|---|
| 2,997,057 A | 8/1961 | Toth |
| 3,061,267 A | 10/1962 | Hamer |
| 3,133,722 A | 5/1964 | McGuire |
| 3,404,904 A | 10/1968 | Roe |
| 3,547,403 A | 12/1970 | Grauer |
| 3,916,950 A | 11/1975 | Mongerson et al. |
| 4,127,991 A | 12/1978 | Regan |
| 4,901,563 A | 2/1990 | Pearson |
| 8,376,046 B2 | 2/2013 | Broussard, II |
| 8,944,159 B2 | 2/2015 | Guidry et al. |
| 9,127,545 B2 | 9/2015 | Kajaria et al. |
| 9,903,190 B2 | 2/2018 | Conrad et al. |
| 10,808,488 B2 | 10/2020 | Witkowski et al. |
| 2006/0027779 A1 | 2/2006 | McGuire et al. |
| 2011/0272158 A1 | 11/2011 | Neal |
| 2012/0072158 A1 | 3/2012 | Li |
| 2012/0181046 A1 | 7/2012 | Kajaria et al. |
| 2012/0242081 A1 | 9/2012 | Keays et al. |
| 2013/0175039 A1 | 7/2013 | Guidry |
| 2013/0233560 A1 | 9/2013 | Davidson |
| 2013/0284455 A1 | 10/2013 | Kajaria et al. |
| 2015/0000766 A1 | 1/2015 | Arizpe et al. |
| 2015/0275629 A1 | 10/2015 | Hatton |
| 2015/0316156 A1 | 11/2015 | Nagahama |
| 2016/0115773 A1 | 4/2016 | Conrad et al. |
| 2017/0122060 A1 | 5/2017 | Dille et al. |
| 2017/0138144 A1 | 5/2017 | Christopherson et al. |
| 2017/0268306 A1 | 9/2017 | Kajaria et al. |
| 2017/0370199 A1 | 12/2017 | Witkowski et al. |
| 2018/0073308 A1 | 3/2018 | Tran et al. |
| 2018/0187662 A1 | 7/2018 | Hill et al. |
| 2018/0298735 A1 | 10/2018 | Conrad |
| 2020/0325752 A1* | 10/2020 | Clark ...................... E21B 43/26 |

* cited by examiner

ADJUSTABLE FRACTURING SYSTEM

CROSS-REFERENCE TO RELATED PATENT APPLICATIONS

This application is a continuation of U.S. patent application Ser. No. 15/631,534, filed Jun. 23, 2017, issuing as U.S. Pat. No. 10,968,717 on Apr. 6, 2021, which claims priority to U.S. Provisional Application No. 62/354,101, filed Jun. 23, 2016, U.S. Provisional Application No. 62/393,990, filed Sep. 13, 2016, U.S. Provisional Application No. 62/412,230, filed Oct. 24, 2016 and U.S. Provisional Application No. 62/421,019, filed Nov. 11, 2016, each of which are incorporated herein by reference in their entirety for any purpose whatsoever.

TECHNICAL FIELD

The present disclosure relates in general to fracturing systems used in oil and gas exploration and production operations and, in particular, to an adjustable fracturing system.

BACKGROUND

In oil or gas operations, hydraulic fracturing systems may be used to fracture one or more subterranean formations by conveying pressurized hydraulic fracturing fluid to one or more wellbores traversing the subterranean formation(s), the wellbore(s) each having a wellhead located at the surface termination thereof. These hydraulic fracturing systems require temporary surface lines, valves, and manifolds (collectively referred to as "frac iron") to deliver the hydraulic fracturing fluid from mixing and pumping equipment to one or more fracturing trees connected to the respective wellhead(s). For example, a fracturing manifold may be used to communicate the hydraulic fracturing fluid to multiple fracturing trees. In addition, a pressurization manifold may be used to communicate the hydraulic fracturing fluid to the fracturing manifold from multiple hydraulic fracturing pumps.

Many hydraulic fracturing systems utilize conventional frac iron connected to, from, or between: each of the various components of the fracturing manifold, the pressurization manifold and the fracturing manifold, each of the various components of the pressurization manifold, and/or each of the fracturing trees and the fracturing manifold. This conventional frac iron is overly complex and creates a multitude of issues at the work site including, but not limited to, excessive setup time and labor costs, limited adjustability, safety risks associated with potential leak points, and decreased pumping efficiency. For example, conventional setups use several piping conduits connected between the fracturing tree and the In extreme cases, conventional frac iron may decrease the effectiveness of fracturing operations, thereby presenting a problem for operators dealing with challenges such as, for example, continuous duty operations, harsh downhole environments, and multiple extended-reach lateral wells, among others.

SUMMARY

In a first aspect, the present disclosure introduces a system, including a first fracturing tree into which a hydraulic fracturing fluid is adapted to flow; a first fluid conduit connected to the first fracturing tree and through which the hydraulic fracturing fluid is adapted to flow before flowing into the first fracturing tree, the first fluid conduit defining a straight fluid flow path; and a first zipper module connected to the first fluid conduit and out of which the hydraulic fracturing fluid is adapted to flow before flowing through the first fluid conduit; wherein the hydraulic fracturing fluid flows along the straight fluid flow path of the first fluid conduit upon flowing out of the first zipper module, and continues to so flow along the straight fluid flow path until the hydraulic fracturing fluid flows into the first fracturing tree.

In an embodiment, the first fluid conduit includes one or more pipes and thus the straight fluid flow path is defined by at least the one or more pipes.

In an embodiment, the first fluid conduit further includes a valve connected to at least one of the one or more pipes and thus the straight fluid flow path is defined by at least the valve and the one or more pipes.

In an embodiment, the first fracturing tree includes a first block defining a first fluid passage into which the hydraulic fracturing fluid is adapted to flow, the first fluid passage being aligned with the straight fluid flow path, and the first block being swivelable to permit the alignment of the first fluid passage with the straight fluid flow path; and the first zipper module includes a second block defining a second fluid passage out of which the hydraulic fracturing fluid is adapted to flow, the second fluid passage being aligned with the straight fluid flow path, and the second block being swivelable to permit the alignment of the second fluid passage with the straight fluid flow path.

In an embodiment, the first fracturing tree includes a first block defining a first fluid passage that is aligned with the straight fluid flow path; the first zipper module includes a second block defining the second fluid passage that is aligned with the straight fluid flow path; and the first and second fluid passages have first and second heights, respectively, at least one of the first and second heights being adjustable to permit the alignment of: the first fluid passage with the straight fluid flow path; and the second fluid passage with the straight fluid flow path.

In an embodiment, the system further includes a second fluid conduit connected to the first zipper module; and a second zipper module connected to the second fluid conduit.

In an embodiment, the first zipper module includes a first block connected to the second fluid conduit; the second zipper module includes a second block connected to the second fluid conduit; and the first and second blocks have first and second heights, respectively, at least one of the first and second heights being adjustable to permit the connection of: the first block to the second fluid conduit; and the second block to the second fluid conduit.

In an embodiment, the system further includes a third fluid conduit connected to the first zipper module; and a third zipper module connected to the third fluid conduit; wherein the first zipper module includes a first block connected to the second fluid conduit, and a second block connected to the third fluid conduit; wherein the second zipper module includes a third block connected to the second fluid conduit, the first and third blocks defining first and second heights, respectively; wherein the third zipper module includes a fourth block connected to the third fluid conduit, the second and fourth blocks defining third and fourth heights, respectively; and wherein: to permit the connection of the first and third blocks to the second fluid conduit: the second block is swivelable relative to the first block; and/or one, or both, of the first and second heights is/are adjustable; and to permit the connection of the second and fourth blocks to the third fluid conduit: the second block is swivelable relative to the first block; and/or one, or both, of the third and fourth heights is/are adjustable.

In a second aspect, the present disclosure introduces a system, including a first fracturing tree including a first block, the first block defining a first fluid passage into which a hydraulic fracturing fluid is adapted to flow, the first fluid passage having a first height; a first fluid conduit connected to the first block and through which the hydraulic fracturing fluid is adapted to flow before flowing into the first fracturing tree, the first fluid conduit defining a fluid flow path with which the first fluid passage is aligned; and a first zipper module including a second block connected to the first fluid conduit, the second block defining a second fluid passage out of which the hydraulic fracturing fluid is adapted to flow before flowing through the first fluid conduit, the second fluid passage having a second height and being aligned with the fluid flow path; wherein, to permit the alignment of the first and second fluid passages with the fluid flow path: one, or both, of the first and second blocks is/are swivelable; and/or one, or both, of the first and second heights is/are adjustable.

In an embodiment, the system further includes a second fluid conduit connected to the first zipper module; and a second zipper module connected to the second fluid conduit.

In an embodiment, the first zipper module includes a third block having a third height and being connected to the second fluid conduit; the second zipper module includes a fourth block having a fourth height and being connected to the second fluid conduit; and one, or both, of the third and fourth heights is/are adjustable to permit the connection of: the third block to the second fluid conduit; and the fourth block to the second fluid conduit.

In an embodiment, the system further includes a third fluid conduit connected to the first zipper module; and a third zipper module connected to the third fluid conduit; wherein the first zipper module includes a third block connected to the second fluid conduit, and a fourth block connected to the third fluid conduit; wherein the second zipper module includes a fifth block connected to the second fluid conduit, the third and fifth blocks defining third and fourth heights, respectively; wherein the third zipper module includes a sixth block connected to the third fluid conduit, the fourth and sixth blocks defining fifth and sixth heights, respectively; wherein: to permit the connection of the third and fifth blocks to the second fluid conduit: the fourth block is swivelable relative to the third block; and/or one, or both, of the third and fourth heights is/are adjustable; and to permit the connection of the fourth and sixth blocks to the third fluid conduit: the fourth block is swivelable relative to the third block; and/or one, or both, of the fifth and sixth heights is/are adjustable.

In a third aspect, the present disclosure introduces a method, including providing a first fracturing tree into which a hydraulic fracturing fluid is adapted to flow; connecting a first fluid conduit to the first fracturing tree, the first fluid conduit defining a straight fluid flow path; connecting a first zipper module, out of which the hydraulic fracturing fluid is adapted to flow, to the first fluid conduit; and pumping the hydraulic fracturing fluid out of the first zipper module, through the first fluid conduit, and into the first fracturing tree so that the hydraulic fracturing fluid flows along the straight fluid flow path upon flowing out of the first zipper module, and continues to so flow along the straight fluid flow path until the hydraulic fracturing fluid flows into the first fracturing tree.

In an embodiment, the first fluid conduit includes one or more pipes and thus the straight fluid flow path is defined by at least the one or more pipes.

In an embodiment, the first fluid conduit further includes a valve connected to at least one of the one or more pipes and thus the straight fluid flow path is defined by at least the valve and the one or more pipes.

In an embodiment, the first fracturing tree includes a first block defining a first fluid passage into which the hydraulic fracturing fluid is adapted to flow, the first fluid passage being aligned with the straight fluid flow path; the first zipper module includes a second block defining a second fluid passage out of which the hydraulic fracturing fluid is adapted to flow, the second fluid passage being aligned with the straight fluid flow path; and the method further includes one, or both, of: swiveling the first block to permit the alignment of the first fluid passage with the straight fluid flow path; and swiveling the second block to permit the alignment of the second fluid passage with the straight fluid flow path.

In an embodiment, the first fracturing tree includes a first block defining a first fluid passage into which the hydraulic fracturing fluid is adapted to flow, the first fluid passage being aligned with the straight fluid flow path; the first zipper module includes a second block defining a second fluid passage out of which the hydraulic fracturing fluid is adapted to flow, the second fluid passage being aligned with the straight fluid flow path; the first and second fluid passages have first and second heights, respectively; and the method further includes adjusting one, or both, of the first and second heights to permit the alignment of: the first fluid passage with the straight fluid flow path; and the second fluid passage with the straight fluid flow path.

In an embodiment, the method further includes connecting a second fluid conduit to the first zipper module; and connecting a second zipper module to the second fluid conduit.

In an embodiment, the first zipper module includes a first block connected to the second fluid conduit, the first block having a first height; the second zipper module includes a second block connected to the second fluid conduit, the second block having a second height; and the method further includes adjusting one, or both, of the first and second heights to permit the connection of: the first block to the second fluid conduit; and the second block to the second fluid conduit.

In an embodiment, the method further includes connecting a third fluid conduit to the first zipper module; and connecting a third zipper module to the third fluid conduit; wherein the first zipper module includes a first block connected to the second fluid conduit, and a second block connected to the third fluid conduit; wherein the second zipper module includes a third block connected to the second fluid conduit, the first and third blocks defining first and second heights, respectively; wherein the third zipper module includes a fourth block connected to the third fluid conduit, the second and fourth blocks defining third and fourth heights, respectively; and wherein the method further includes at least one of: swiveling the second block relative to the first block to permit the connection of: the first and third blocks to the second fluid conduit, and the second and fourth blocks to the third fluid conduit; adjusting one, or both, of the first and second heights to permit the connection of the first and third blocks to the second fluid conduit; or adjusting one, or both, of the third and fourth heights to permit the connection of the second and fourth blocks to the third fluid conduit.

DETAILED DESCRIPTION

Figure 1:
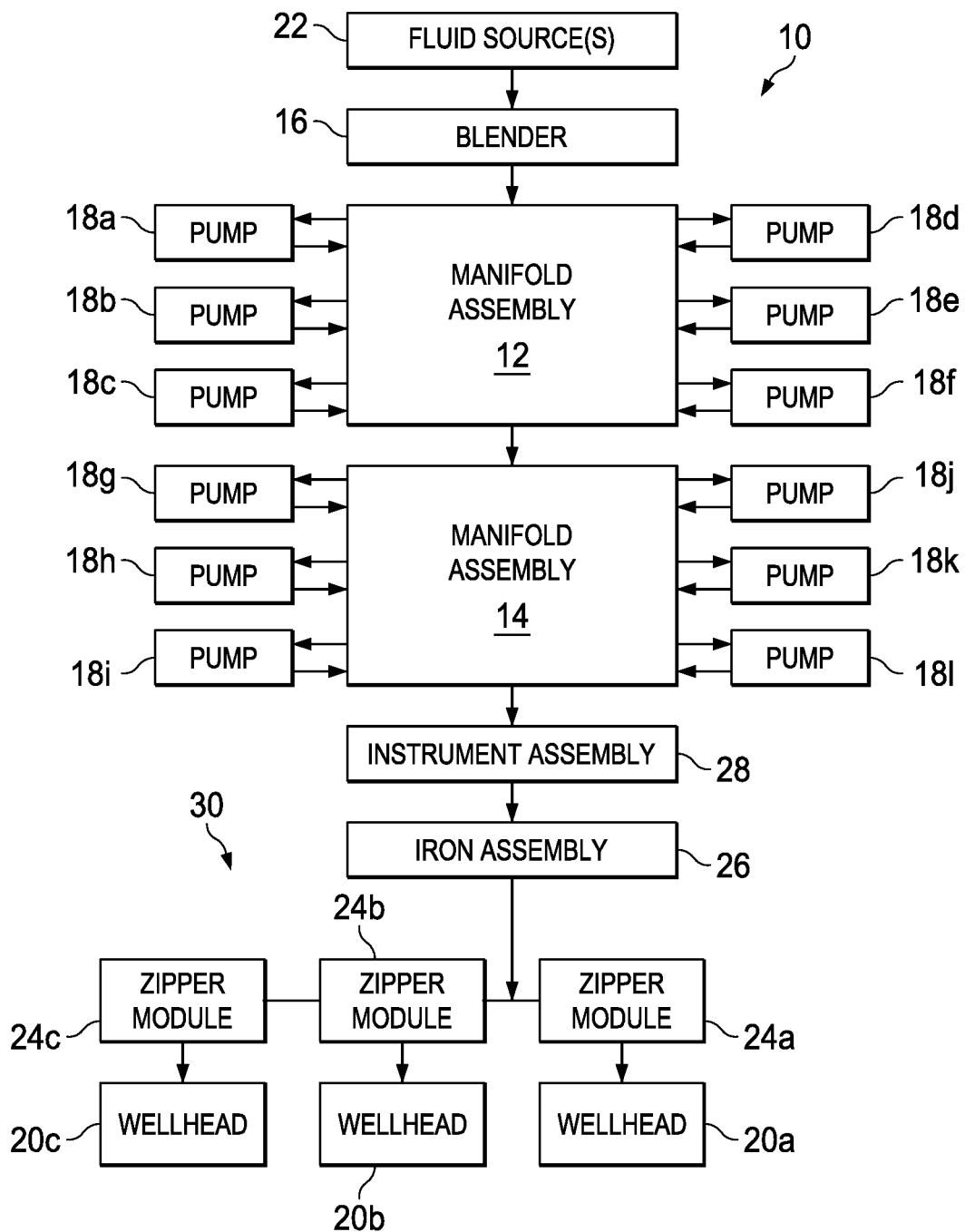
FIG. 1 is a schematic illustration of a hydraulic fracturing system including, inter alia, one or more zipper modules and one or more wellheads, according to one or more embodiments of the present disclosure.

Turning to FIG. 1, a system is generally referred to by the reference numeral 10 and includes manifold assemblies 12 and 14 in fluid communication with a blender 16, hydraulic fracturing pumps 18a-1, and wellheads 20a-c. The system 10 includes one or more fluid sources 22 that are in fluid communication with the blender 16. The wellheads 20a-c are in fluid communication with the manifold assemblies 12 and 14 via, for example, zipper modules 24a-c, an iron assembly 26, and an instrument assembly 28. The zipper modules 24a-c are connected to the wellheads 20a-c, respectively, and are interconnected with each other to form a zipper manifold 30 to which the iron assembly 26 is connected. The instrument assembly 28 is connected to both the iron assembly 26 and the manifold assembly 14. In an embodiment, the system 10 is part of a hydraulic fracturing (or "frac") system, which may be used to facilitate oil and gas exploration and production operations. The embodiments provided herein are not, however, limited to a hydraulic fracturing system, as the embodiments may be used with, or adapted to, a mud pump system, a well treatment system, other pumping systems, one or more systems at the wellheads 20a-c, one or more systems upstream of the wellheads 20a-c, one or more systems downstream of the wellheads 20a-c, or one or more other systems associated with the wellheads 20a-c.

Figure 2:
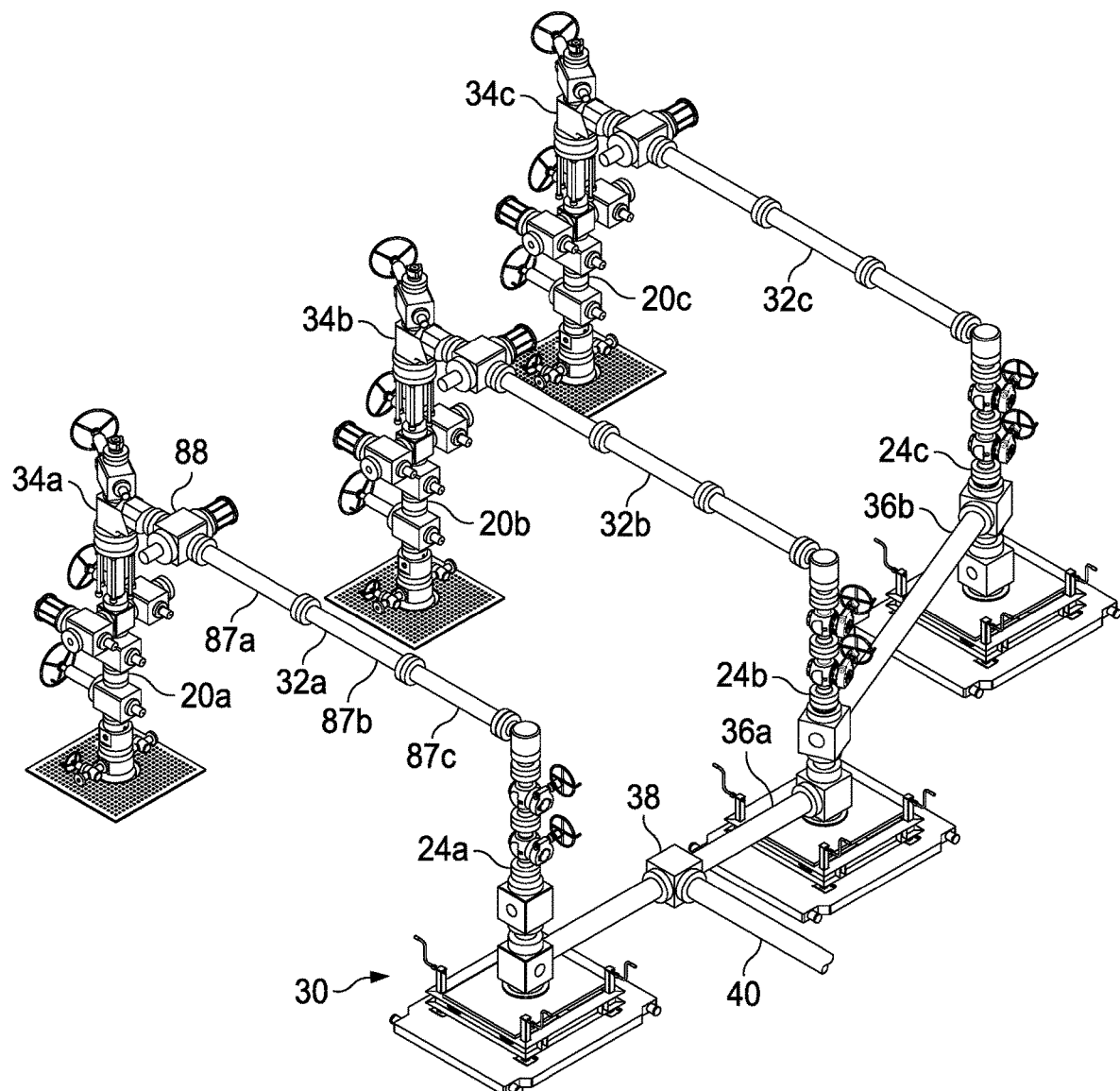
FIG. 2 is a perspective view of the one or more zipper modules and the one or more wellheads of FIG. 1, the one or more zipper modules being connected to, and in fluid communication with, the one or more wellheads via one or more fluid conduits and one or more frac trees, according to one or more embodiments of the present disclosure.

Turning to FIG. 2, with continuing reference to FIG. 1, it can be seen that the zipper modules 24a-c are connected to fluid conduits 32a-c, respectively, the wellheads 20a-c are connected to fracturing (or "frac") trees 34a-c, respectively, and the fluid conduits 32a-c are connected to the frac trees 34a-c, respectively. The respective zipper modules 24a-c are thus connected to, and in fluid communication with, the wellheads 20a-c via respective pairs of the fluid conduits 32a-c and frac trees 34a-c. The wellheads 20a-c are each located at the top or head of an oil and gas wellbore (not shown) that penetrates one or more subterranean formations (not shown), and are used in oil and gas exploration and production operations. To form the zipper manifold 30, the zipper modules 24a and 24b are interconnected with each other via a fluid conduit 36a, and the zipper modules 24b and 24c are interconnected with each other via a fluid conduit 36b. The fluid conduit 36a includes a block 38 to which a pipe 40 is connected to thereby connect the zipper manifold 30 to the iron assembly 26 (see FIG. 1). In an alternative embodiment, rather than the fluid conduit 36a including the block 38, the fluid conduit 36b includes the block 38 to thereby connect the zipper manifold 30 to the iron assembly 26 via the pipe 40. In another alternative embodiment, the block 36 is omitted and the pipe 40 is instead connected directly to one of the zipper modules 24a-c.

The wellheads 20a-c are substantially identical to each other, and, therefore, in connection with FIGS. 3, 5, and 6, only the wellhead 20a will be described in detail below; however, the description below applies to every one of the wellheads 20a-c. Likewise, the frac trees 34a-c are substantially identical to each other, and, therefore, in connection with FIGS. 3-6, only the frac tree 34a will be described in detail below; however, the description below applies to every one of the frac trees 34a-c.

Figure 3:
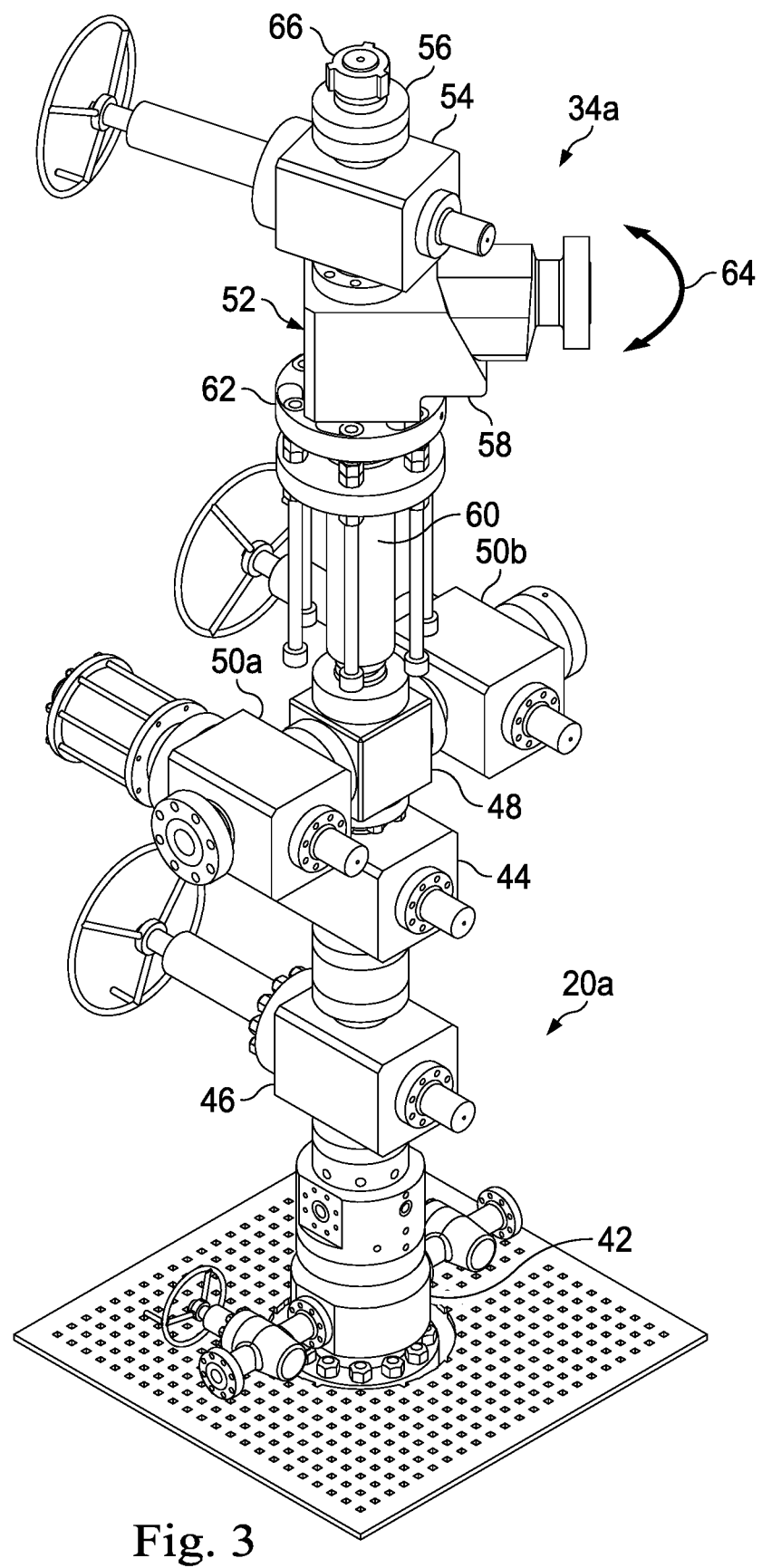
FIG. 3 is a perspective view of one of the frac trees connected to one of the wellheads of FIG. 2, the frac tree including an adjustable-length pipe and a block that is swivelable, according to one or more embodiments of the present disclosure.

Turning to FIG. 3, the wellhead 20a includes an adapter 42, a pair of master valves, such as, for example, upper and lower gate valves 44 and 46, and a production tee 48. The upper and lower gate valves 44 and 46 are connected to each other in series above the adapter 42. In some embodiments, the upper gate valve 44 is an automatic gate valve, and the lower gate valve 46 is a manual gate valve. In another embodiment, the upper and lower gate valves 44 and 46 are omitted in favor of upper and lower plug valves (not shown). The adapter 42 is connected to the lower gate valve 46 and facilitates connection of the wellhead 20a to a casing string (not shown) and/or a tubing string (not shown) extending within the associated wellbore. The production tee 48 is connected to the upper gate valve 44 and has a production wing valve 50a and a kill wing valve 50b connected thereto.

The frac tree 34a is connected to the wellhead 20a and includes an adjustable flow iron section 52, a swab valve 54 (e.g., a gate valve), and a tree adapter 56. The adjustable flow iron section 52 is connected to the production tee 48 of the wellhead 20a, opposite the upper gate valve 44, and includes a block 58, a pipe 60, and an adjustable-length pipe 62 connected between the block 58 and the pipe 60. In some embodiments, the adjustable-length pipe 62 is, includes, or is part of, the pipe 60. The block 58 of the frac tree 34*a* is configured to rotate or swivel about a vertical axis and relative to the production tee 48, the upper and lower gate valves 44 and 46, and the adapter 42, as indicated by FIG. 3's curvilinear arrow 64. The rotation or swiveling of the block 58 about the vertical axis is facilitated by a swivel assembly incorporated into the block 58, the pipe 60, and/or the adjustable-length pipe 62. The tree adapter 56 is connected to the swab valve 54 opposite the adjustable flow iron section 52, and includes a cap 66 at which a gauge (not shown) may be connected to verify closure of the swab valve 54.

Figure 4:
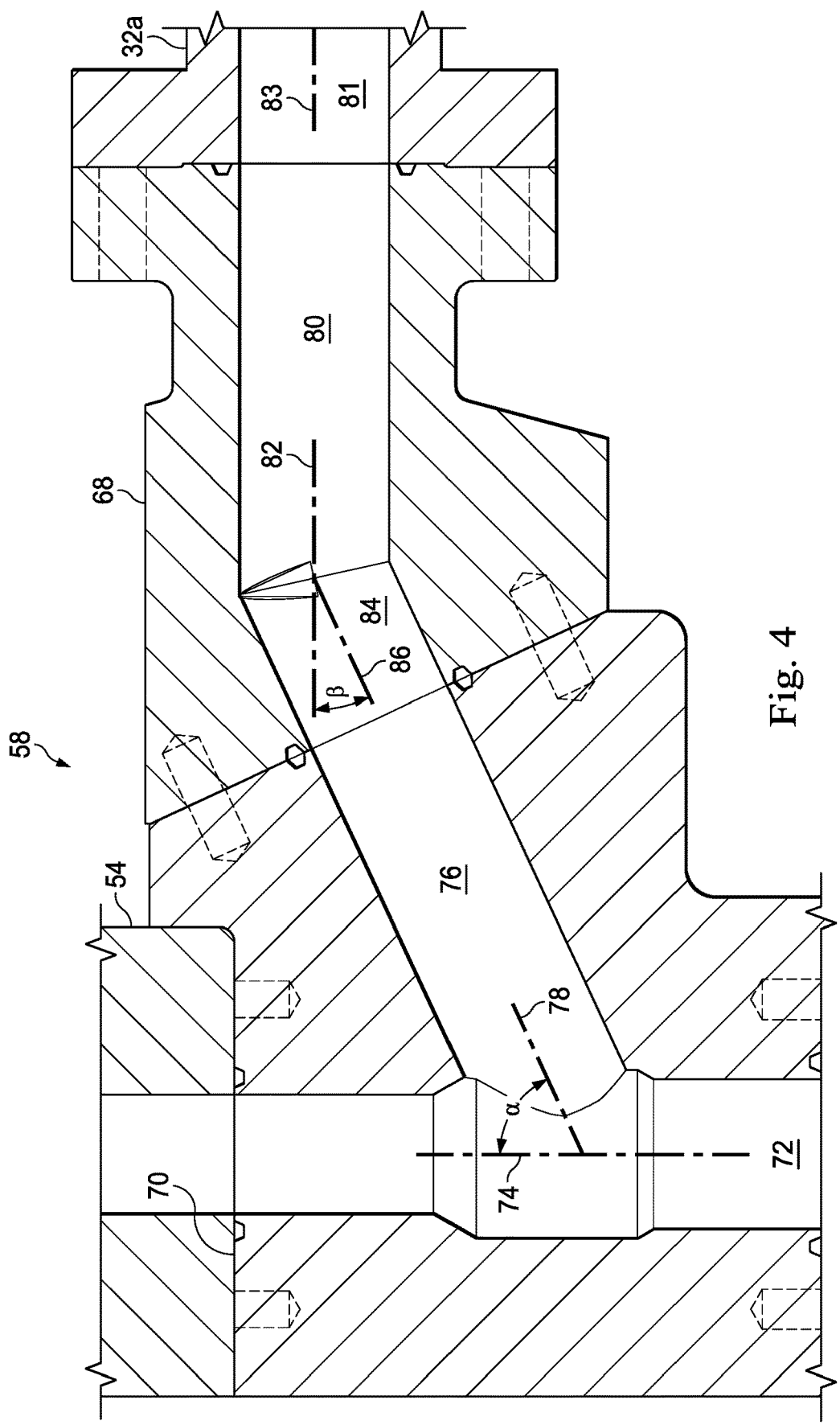
FIG. 4 is a cross-sectional view of the block of FIG. 3, according to one or more embodiments of the present disclosure.

Turning to FIG. 4, with continuing reference to FIG. 3, the block 58 includes an inlet segment 68 connected to an outlet segment 70. The outlet segment 70 is connected between, and in fluid communication with, the adjustable-length pipe 62 and the swab valve 54 (shown, e.g., in FIG. 3). The inlet segment 68 is connected between, and in fluid communication with, the outlet segment 70 and the fluid conduit 32*a* (shown, e.g., in FIG. 2). In an embodiment, the inlet segment 68 and the outlet segment 70 are integrally formed. The outlet segment 70 defines an outlet passage 72 via which the outlet segment 70 is in fluid communication with the adjustable-length pipe 62 and the swab valve 54. The outlet passage 72 extends through the outlet segment 70 along an axis 74. The outlet segment 70 also defines an inlet passage 76 via which the outlet segment 70 is in fluid communication with the inlet segment 68. The inlet passage 76 extends upward-and-to-the-right (as viewed in FIG. 4) from the outlet passage 72 along an axis 78 that is oriented at an angle α with respect to the axis 74 of the outlet passage 72.

The inlet segment 68 defines an inlet passage 80 via which the inlet segment 68 is in fluid communication with a straight fluid flow path 81 of the fluid conduit 32*a* (shown, e.g., in FIG. 2). The inlet passage 80 of the inlet segment 68 is aligned with the straight fluid flow path 81 of the fluid conduit 32*a*. The inlet passage 80 extends along an axis 82. The straight fluid flow path 81 extends along an axis 83. In an embodiment, the inlet passage 80 of the inlet segment 68 is substantially coaxial with the straight fluid flow path 81 of the fluid conduit 32*a* (i.e., the axes 82 and 83 are substantially coaxial). However, the inlet passage 80 of the inlet segment 68 need not be substantially coaxial with the straight fluid flow path 81 of the fluid conduit 32*a* to be otherwise aligned therewith. The inlet segment 68 also defines an outlet passage 84 via which the inlet segment 68 is in fluid communication with the outlet segment 70. The outlet passage 84 extends downward-and-to-the-left (as viewed in FIG. 4) from the inlet passage 66 along an axis 86 oriented at an angle β with respect to the axis 82 of the inlet passage 80. In an embodiment, the outlet passage 84 of the inlet segment 68 is substantially coaxial with the inlet passage 76 of the outlet segment 70 (i.e., the axes 78 and 86 are substantially coaxial). In some embodiments, the sum of the angles α and β is about 90 degrees. The coaxial extension of the inlet and outlet passages 76 and 84 at the angles α and β, respectively, reduces wear and excessive turbulence in the block 58 by, for example, easing the change in the direction of fluid flow and eliminating blinded-off connections.

Turning back to FIG. 2, with continuing reference to FIG. 4, the fluid conduit 32*a* includes pipes 87*a-c* and a gate valve 88 (shown in FIG. 2). In some embodiments, the gate valve 88 is an automatic valve. In another embodiment, the gate valve 88 is omitted in favor of a plug valve (not shown). Moreover, although the fluid conduit 32*a* has been described herein as including the pipes 87*a-c* and the gate valve 88, the fluid conduit 32*a* may instead include any combination of pipes, valves, blocks, or other components defining the straight fluid flow path 81 between the block 58 of the frac tree 34*a* and the block 102 of the zipper module 24*a* (see, e.g., FIGS. 4 and 8).

In some embodiments, the angle α at which the inlet passage 76 of the outlet segment 70 is angled is: about 60 degrees from a vertical center axis that extends through the center of the vertical flow passage of the frac tree 34*a*; about 45 degrees from said vertical center axis; and/or ranges from about 10 degrees to about 80 degrees from said vertical center axis. In some embodiments, the angle β at which the outlet passage 84 of the inlet segment 68 is angled is: about 30 degrees from the vertical center axis that extends through the center of the vertical flow passage of the frac tree 34*a*; about 45 degrees from said vertical center axis; and/or ranges from about 80 degrees to about 10 degrees from said vertical center axis. In some embodiments, the axis 74 of the outlet passage 72 of the outlet segment 70 is substantially coaxial with the vertical center axis that extends through the center of the vertical flow passage of the frac tree 34*a*.

Figure 5:
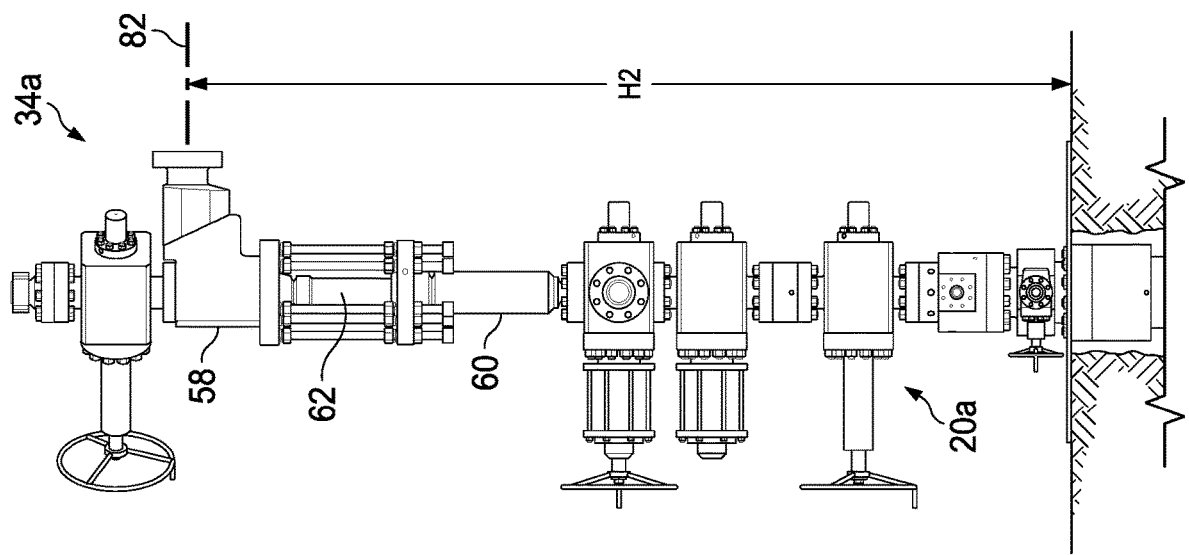
FIGS. 5 and 6 are elevational views of the frac tree and the wellhead of FIG. 3, the block of the frac tree being adjusted between first and second heights, respectively, by the adjustable-length pipe, according to one or more embodiments of the present disclosure.
Figure 6:
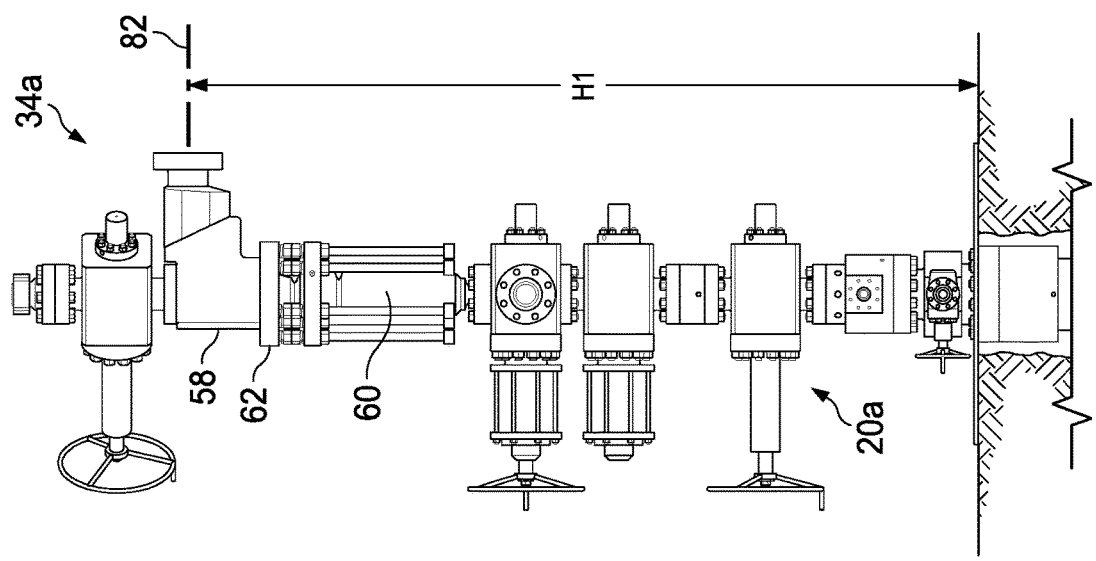

Turning to FIGS. 5 and 6, with continuing reference to FIGS. 3 and 4, the adjustable-length pipe 62 of the frac tree 34*a* is adjustable from a configuration in which the axis 82 of the block 58 is positioned at a height H1 above the ground to a configuration in which the axis 82 of the block 58 is positioned at a height H2 above the ground, the height H2 being greater than the height H1. In some embodiments, the block 58 is further adjustable to one or more configurations in which the axis 82 of the block 58 is positioned at a height above the ground ranging from the height H1 to the height H2. Accordingly, the adjustable-length pipe 62 of the frac tree 34*a* is adjustable to facilitate alignment between the frac tree 34*a* and the zipper module 24*a*, as will be discussed in further detail below.

The zipper modules 24*a-c* are substantially identical to each other, and, therefore, in connection with FIGS. 7-9, only the zipper module 24*a* will be described in detail below; however, the description below applies to every one of the zipper modules 24*a-c*.

Figure 7:
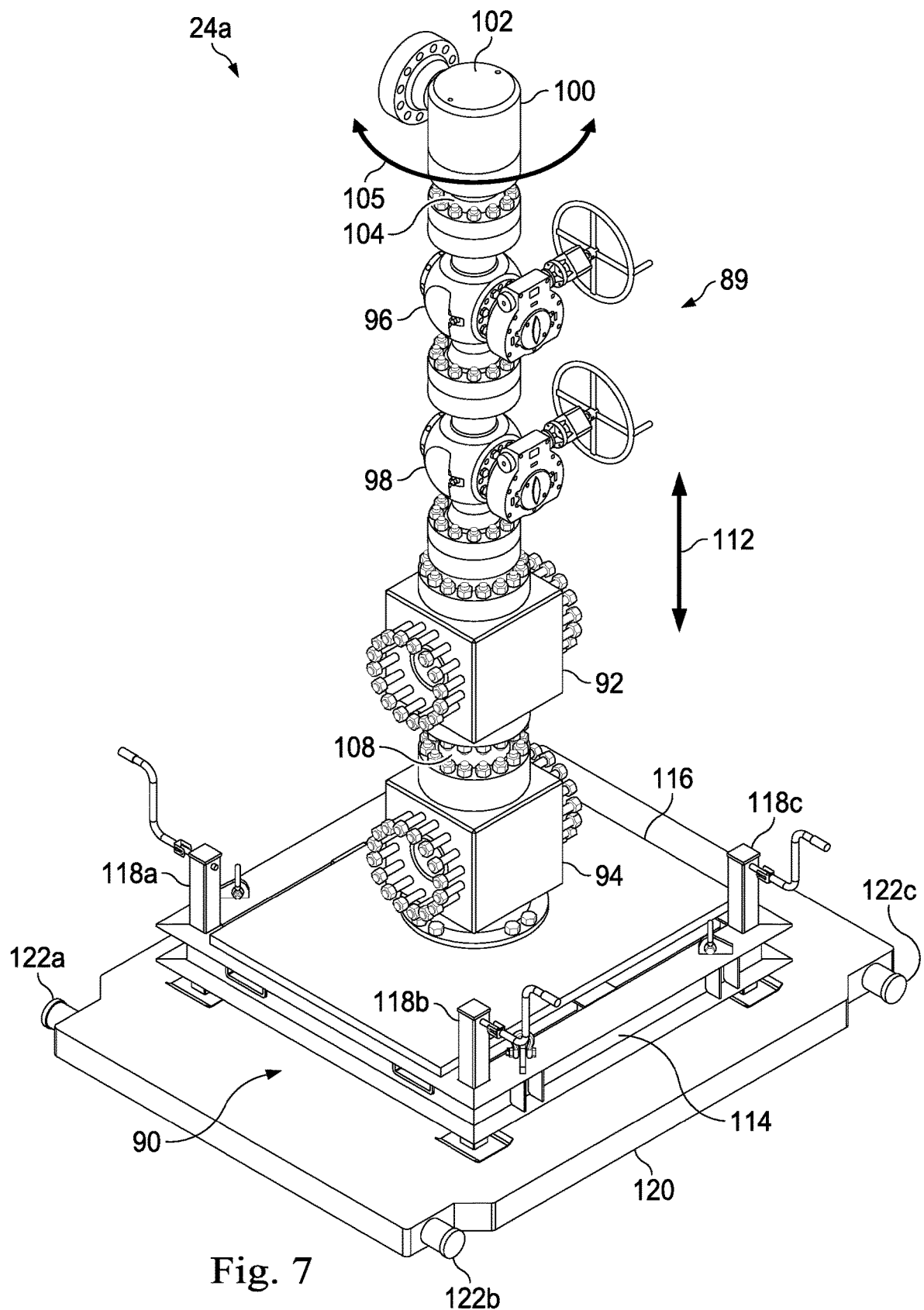
FIG. 7 is a perspective view of one of the zipper modules of FIGS. 1 and 2, the zipper module including a block that is swivelable, according to one or more embodiments of the present disclosure.

Turning to FIG. 7, with continuing reference to FIG. 2, the zipper module 24*a* includes a zipper tree 89 supported by an adjustable skid 90. The zipper tree 89 includes upper and lower blocks 92 and 94, a pair of valves, such as, for example, upper and lower plug valves 96 and 98, and an adjustable flow iron section 100. The upper and lower plug valves 96 and 98 are connected to each other in series, the lower plug valve 98 being connected to the upper block 92. In some embodiments, the upper and lower plug valves 96 and 98 are manual plug valves. In other embodiments, at least one of the upper and lower plug valves 96 and 98 is an automatic plug valve. In another embodiment, the upper and lower plug valves 96 and 98 are omitted in favor of upper and lower gate valves (not shown). The adjustable flow iron section 100 is connected to the upper plug valve 96, opposite the lower plug valve 98, and includes a block 102 connected to a pipe 104. The block 102 of the zipper tree 89 is configured to rotate or swivel about a vertical axis and relative to the upper and lower plug valves 96 and 98, as indicated by FIG. 7's curvilinear arrow 105. The rotation or swiveling of the block 102 about the vertical axis and relative to the upper and lower plug valves 96 and 98 is facilitated by a swivel assembly incorporated into the block 102 and/or the pipe 104.

Figure 8:
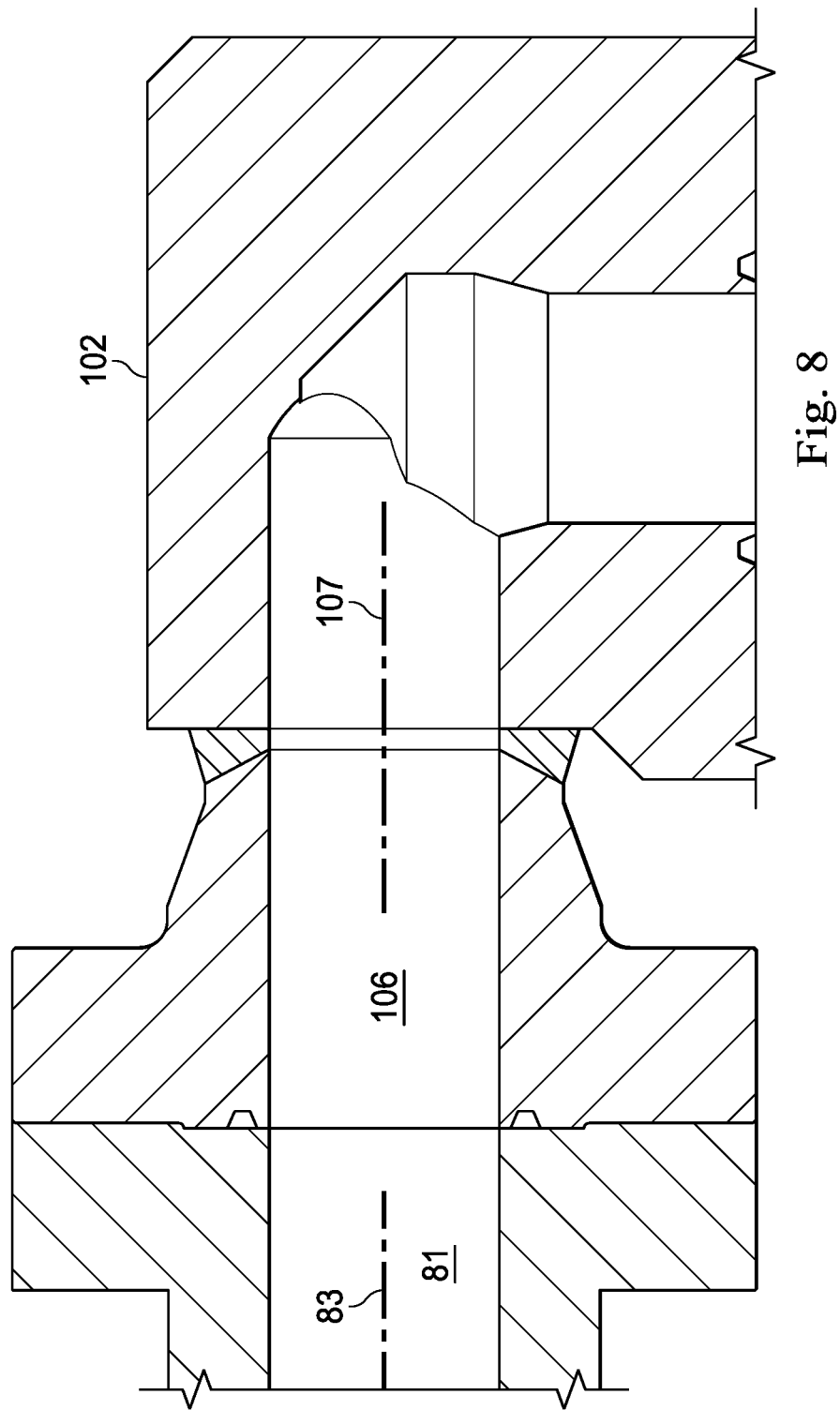
FIG. 8 is a cross-sectional view of the block of FIG. 7, according to one or more embodiments of the present disclosure.

Turning to FIG. 8, with continuing reference to FIGS. 2 and 7, the block 102 defines an outlet passage 106 via which the block 102 is in fluid communication with the straight fluid flow path 81 of the fluid conduit 32*a* (shown also, e.g., in FIG. 3). The outlet passage 106 of the block 102 is aligned with the straight fluid flow path 81 of the fluid conduit 32*a*. The outlet passage 106 extends along an axis 107. The straight fluid flow path 81 extends along the axis 83. In an embodiment, the outlet passage 106 of the block 102 is substantially coaxial with the straight fluid flow path 81 of the fluid conduit 32*a* (i.e., the axes 83 and 107 are substantially coaxial). However, the outlet passage 106 of the block 102 need not be substantially coaxial with the straight fluid flow path 81 of the fluid conduit 32*a* to be otherwise aligned therewith. In some embodiments, the block 102 has a rounded, or chamfered, internal profile; this rounded, or chamfered, internal profile is configured to reduce wear and excessive turbulence in the block 102 by, for example, easing the change in the direction of fluid flow and eliminating blinded-off connections.

Figure 9:
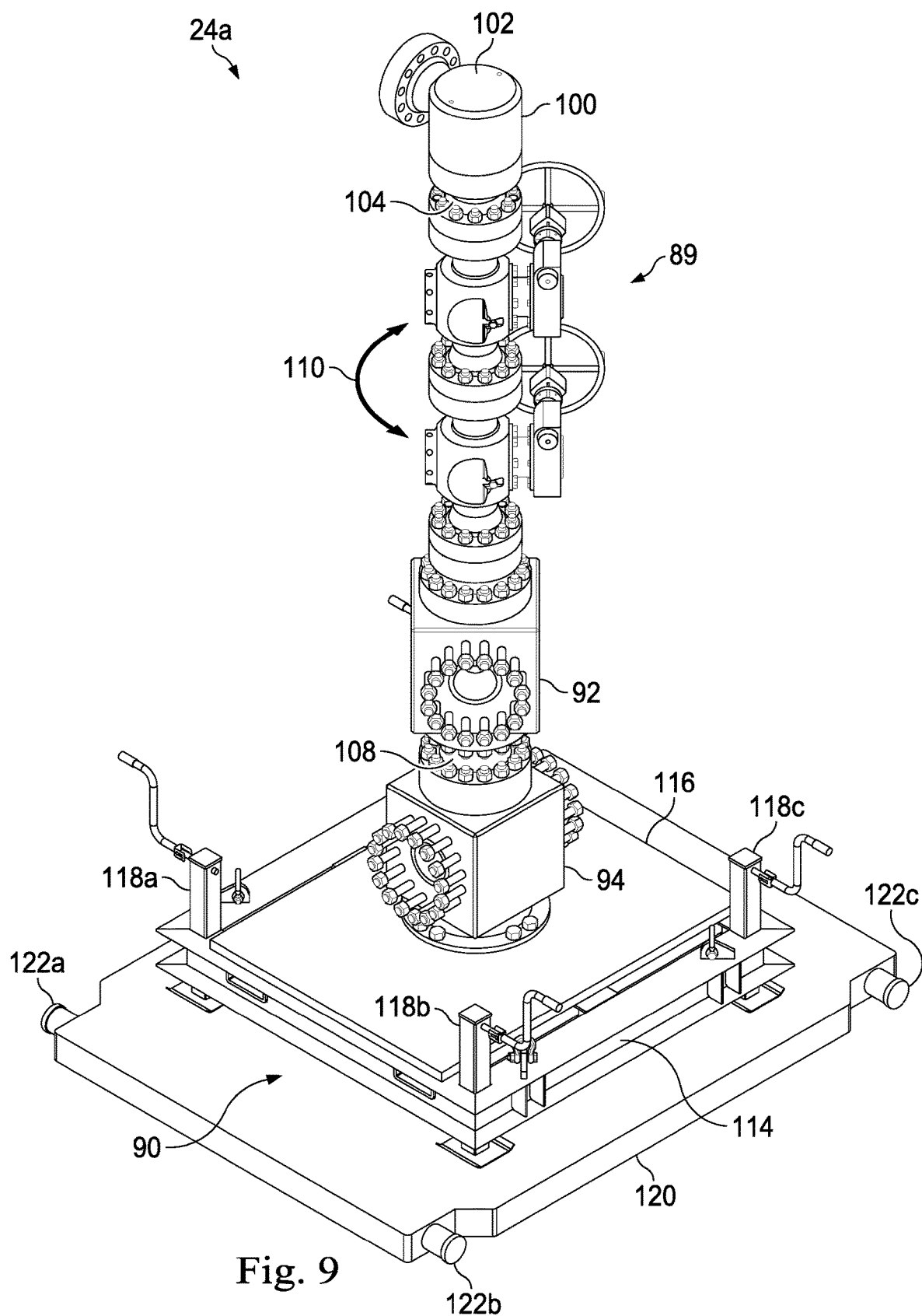
FIG. 9 is a perspective view of the zipper module similar to the view illustrated in FIG. 7, except that the block has been swiveled to a different rotational orientation relative to one or more other components of the zipper module, according to one or more embodiments of the present disclosure.

Turning to FIG. 9, with continuing reference to FIGS. 2 and 7, the upper block 92 is connected to the lower block 94 via a fluid conduit, such as, for example, a pipe 108. The upper block 92 is configured to rotate or swivel about a vertical axis and relative to the lower block 94, as indicated by FIG. 9's curvilinear arrow 110. The resulting change in the circumferential orientation of the upper block 92 relative to the lower block 94 effects a circumferential offset therebetween, as shown in FIG. 9. The rotation or swiveling of the upper block 92 about the vertical axis and relative to the lower block 94 is facilitated by a swivel assembly incorporated into the pipe 108, the upper block 92, and/or the lower block 94.

In an alternative embodiment, in order to effect FIG. 9's circumferential offset between the upper block 92 and the lower block 94, the upper block 92 must be de-coupled from the lower block 94, and, subsequently, re-coupled to the lower block 94 (via the pipe 108) with a different circumferential orientation relative thereto. For example, the pipe 108 extending between the upper and lower blocks 92 and 94 may be connected to the upper and lower blocks 92 and 94 via respective fixed flange connections, each of which has at least one plurality of circumferentially-spaced flange bolt holes; therefore, the relative circumferential orientation between the upper and lower blocks 92 and 94 may be modified by disconnecting one of the flange connections between the pipe 108 and one of the upper and lower blocks 92 and 94, and then adjusting the relative circumferential orientation between the upper and lower blocks 92 and 94 by rotating the plurality of circumferentially-spaced flange bolt holes of the disconnected flange connection; in this manner, the relative circumferential orientation between the upper and lower blocks 92 and 94 may be adjusted in an increment equaling a circumferential spacing between a pair of flange bolt holes.

In addition to the upper block 92 being connected to the lower block 94, the upper block 92 is also connected to the lower plug valve 98. In some embodiments, the circumferential orientation of the upper block 92 relative to the lower plug valve 98 can be changed by, for example, disconnecting the upper block 92 from the lower plug valve 98, and, subsequently, re-connecting the upper block 92 to the lower plug valve 98 with a different circumferential orientation relative thereto. For example, the upper block 92 may be connected to the lower plug valve 98 via a flange fixedly connected to the upper block 92, the flange having a plurality of circumferentially-spaced flange bolt holes; therefore, the circumferential orientation of the upper block 92, relative to the lower plug valve 98, may be adjusted in increments equaling circumferential spacings between respective pairs of flange bolt holes. Alternatively, a change in the circumferential orientation of the upper block 92 may be facilitated by a swivel connection (not shown) provided between the upper block 92 and the lower plug valve 98. Such changes in the circumferential orientation of the upper block 92 relative to the lower plug valve 98 effect a circumferential offset therebetween.

Turning back to FIG. 7, with continuing reference to FIG. 9, the adjustable skid 90 is configured to displace the zipper tree 89 to align the upper and lower blocks 92 and 94 of the zipper module 24*a* with corresponding upper and lower blocks of the zipper module 24*b* (which are analogous to the upper and lower blocks 92 and 94 of the zipper module 24*a*), as will be discussed in further detail below. More particularly, the adjustable skid 90 is configured to displace the zipper tree 89 up and down in the vertical direction as indicated by FIG. 7's linear arrow 112. The adjustable skid 90 includes a generally rectangular base 114, a carriage plate 116 supported on the base 114, and jacks 118*a-d* connected to the base 114 (the jack 118*d* is not visible in FIG. 7). In some embodiments, one or more mounting brackets (not shown) connect the lower block 94 of the zipper tree 89 to the carriage plate 116 of the adjustable skid 90.

The zipper module 24*a* is positioned on a transport skid 120 that includes lifting pegs 122*a-d* (the lifting peg 122*d* is not visible in FIG. 7) configured to facilitate placement of zipper module 24*a* on a generally horizontal surface proximate one of the frac trees 34*a-c* via a lifting mechanism, such as, for example, a crane, a forklift, a front-end loader, or another lifting mechanism. The jacks 118*a-d* are connected to respective corners of the base 114 so that, when the adjustable skid 90 is positioned on the generally horizontal surface proximate the frac tree 34*a*, the jacks 118*a-d* are operable to level, and to adjust the height of, the base 114.

In addition to, or instead of, the adjustable-length pipe 62 being incorporated into the frac tree 34*a*, an adjustable-length pipe (not shown; similar to the adjustable-length pipe 62) may be incorporated into the zipper tree 89. In an example embodiment, the adjustable-length pipe is, includes, or is part of, the pipe 104. In another example embodiment, the adjustable-length pipe is, includes, or is part of the pipe 108. Thus, in addition to, or instead of, the adjustable-length pipe 62 of the frac tree 34*a* being adjustable to facilitate alignment between the frac tree 34*a* and the zipper module 24*a*, the adjustable-length pipe (not shown) of the zipper tree 89 is adjustable to facilitate alignment between the zipper module 24*a* and the frac tree 34*a*, as will be discussed in further detail below.

The frac trees 34*b* and 34*c* are each substantially identical to the frac tree 34*a*, and, therefore, in connection with FIGS. 10-15, parts of the frac trees 34*b* and 34*c* that are substantially identical to corresponding parts of the frac tree 34*a* are given the same reference numerals. Likewise, the zipper modules 24*b* and 24*c* are each substantially identical to the zipper module 24*a*, and, therefore, in connection with FIGS. 10-15, parts of the zipper modules 24*b* and 24*c* that are substantially identical to corresponding parts of the zipper module 24*a* are given the same reference numerals.

Figure 10:
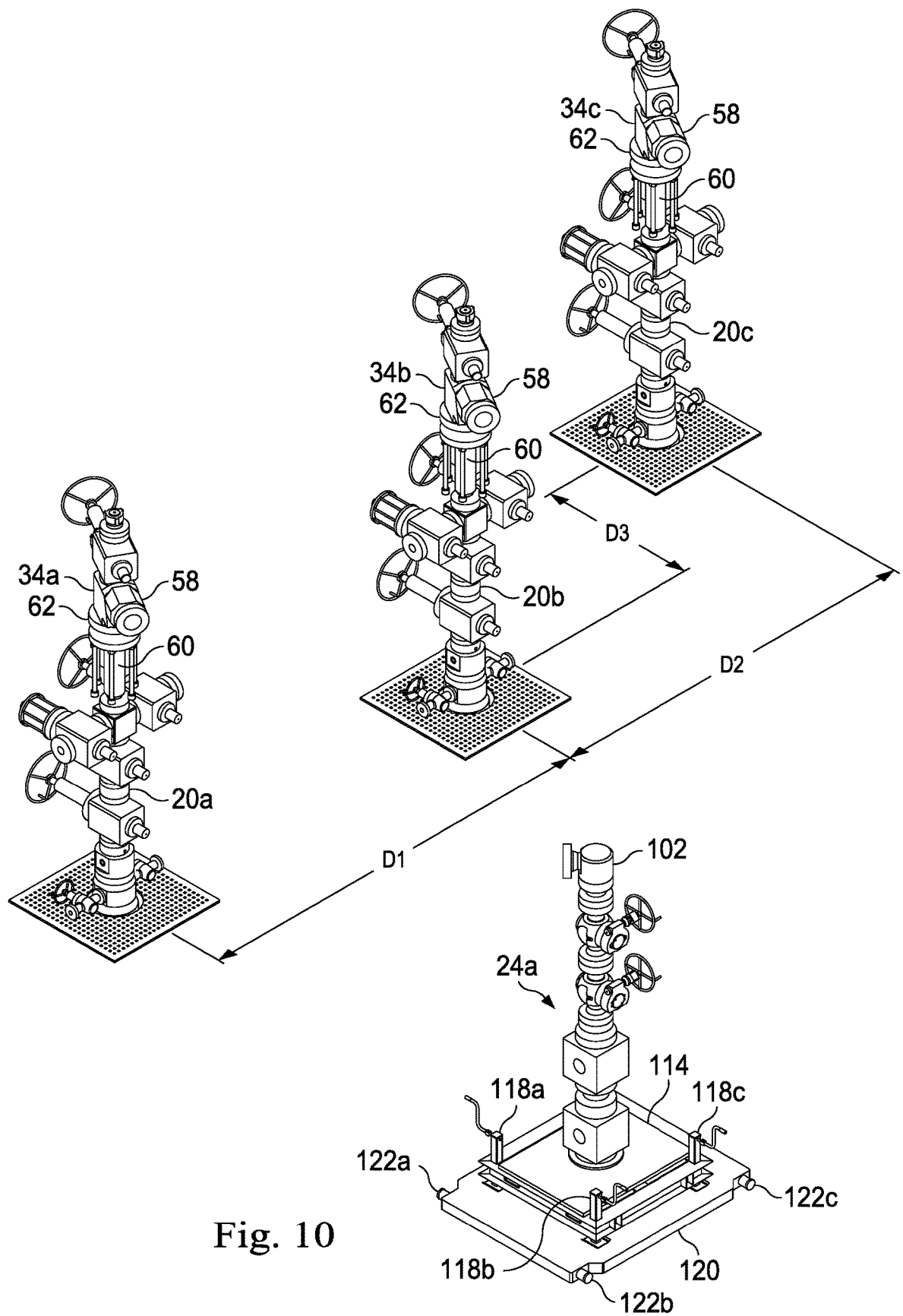
FIG. 10-15 are perspective views illustrating first, second, third, fourth, fifth, and sixth stages, respectively, for connecting the one or more zipper modules (shown in FIGS. 1, 2, and 7-9) to the one or more wellheads (shown in FIGS. 1-3, 5, and 6) via the one or more fluid conduits (shown in FIGS. 2, 4, and 8) and the one or more frac trees (shown in FIGS. 2-6), according to one or more embodiments of the present disclosure.
Figure 11:
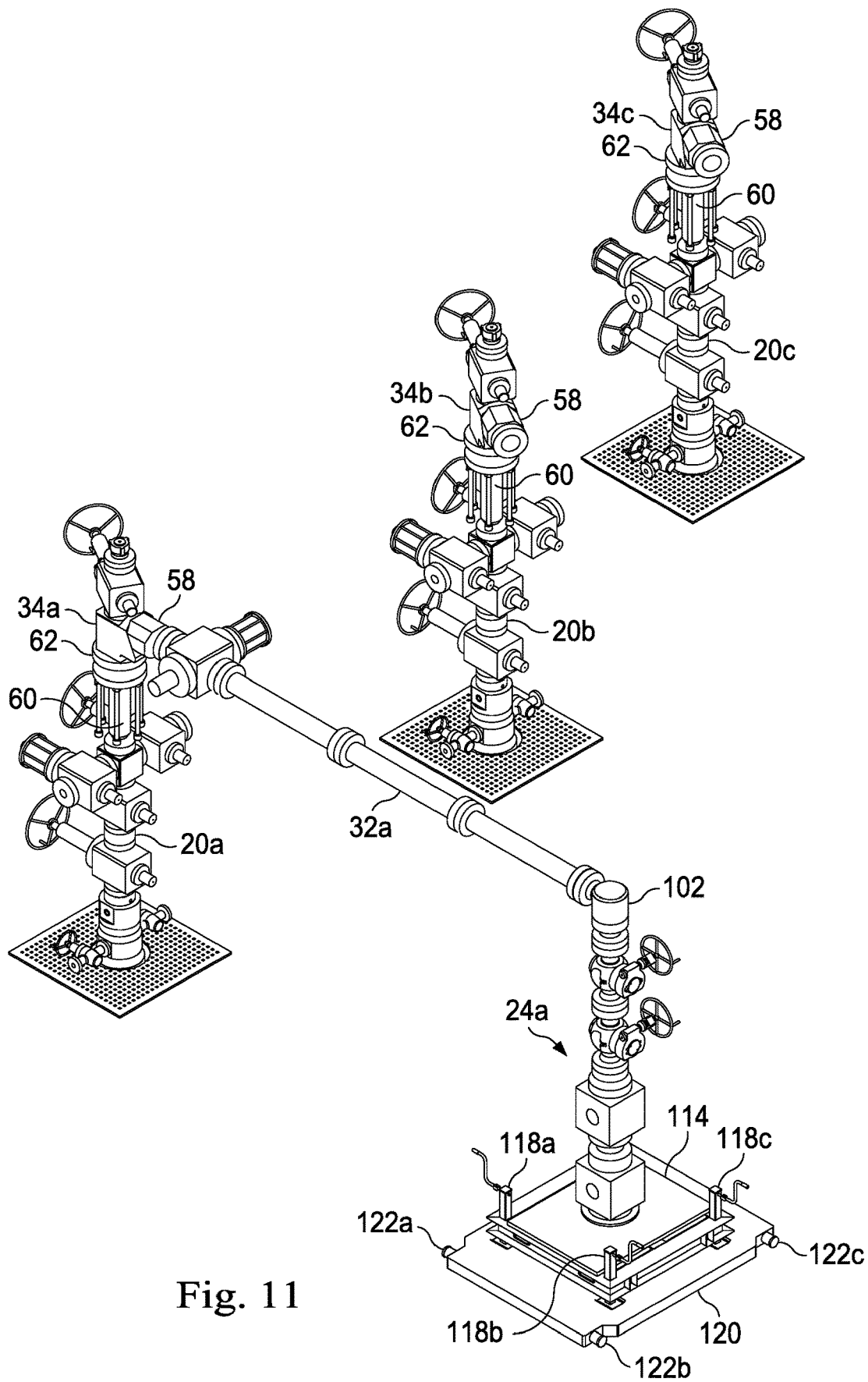

Turning to FIGS. 10 and 11, it can be seen that the wellhead 20*b* is spaced apart from the wellhead 20*a* by a distance D1 (measured from left-to-right as viewed in FIG. 10), and the wellhead 20*c* is spaced apart from the wellhead 20*b* by a distance D2 (measured from left-to-right as viewed in FIG. 10). In some embodiments, the distance D1 is different than the distance D2. In addition to being spaced apart from the wellhead 20*b* by the distance D2, the wellhead 20*c* is offset from the wellhead 20*b* by a distance D3

(measured from front-to-back as viewed in FIG. 10). To begin the process of assembling the zipper manifold 30, the lifting mechanism (not shown) engages the lifting pegs 122a-d of the transport skid 120 to place the zipper module 24a on the generally horizontal surface proximate the wellhead 20a, as shown in FIG. 10. The jacks 118a-d are adjusted to substantially level the base 114 of the zipper module 24a, and the adjustable-length pipe 62 is adjusted (if necessary) to align the block 58 of the frac tree 34a with the block 102 of the zipper module 24a. In addition to, or instead of, adjusting the adjustable-length pipe 62 of the frac tree 34a, an adjustable-length pipe (not shown; similar to the adjustable-length pipe 62) incorporated into the zipper tree 89 of the zipper module 24a is adjusted (if necessary) to align the block 102 of the zipper module 24a with the block 58 of the frac tree 34a. Once properly aligned, the respective blocks 58 and 102 of the frac tree 34a and the zipper module 24a are rotated to face each other so that the fluid conduit 32a may be connected therebetween, as shown in FIG. 11.

Figure 12:
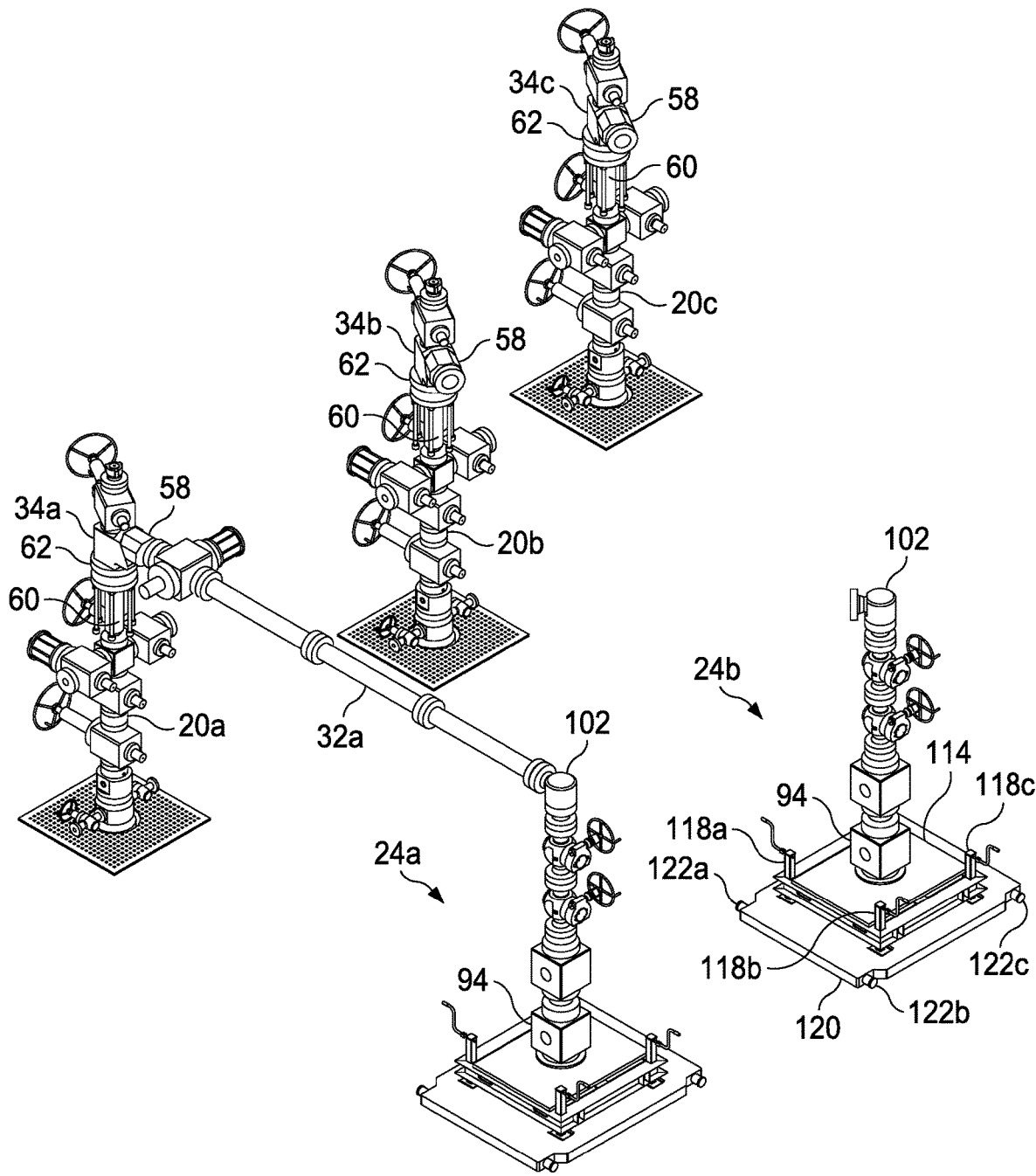
Figure 13:
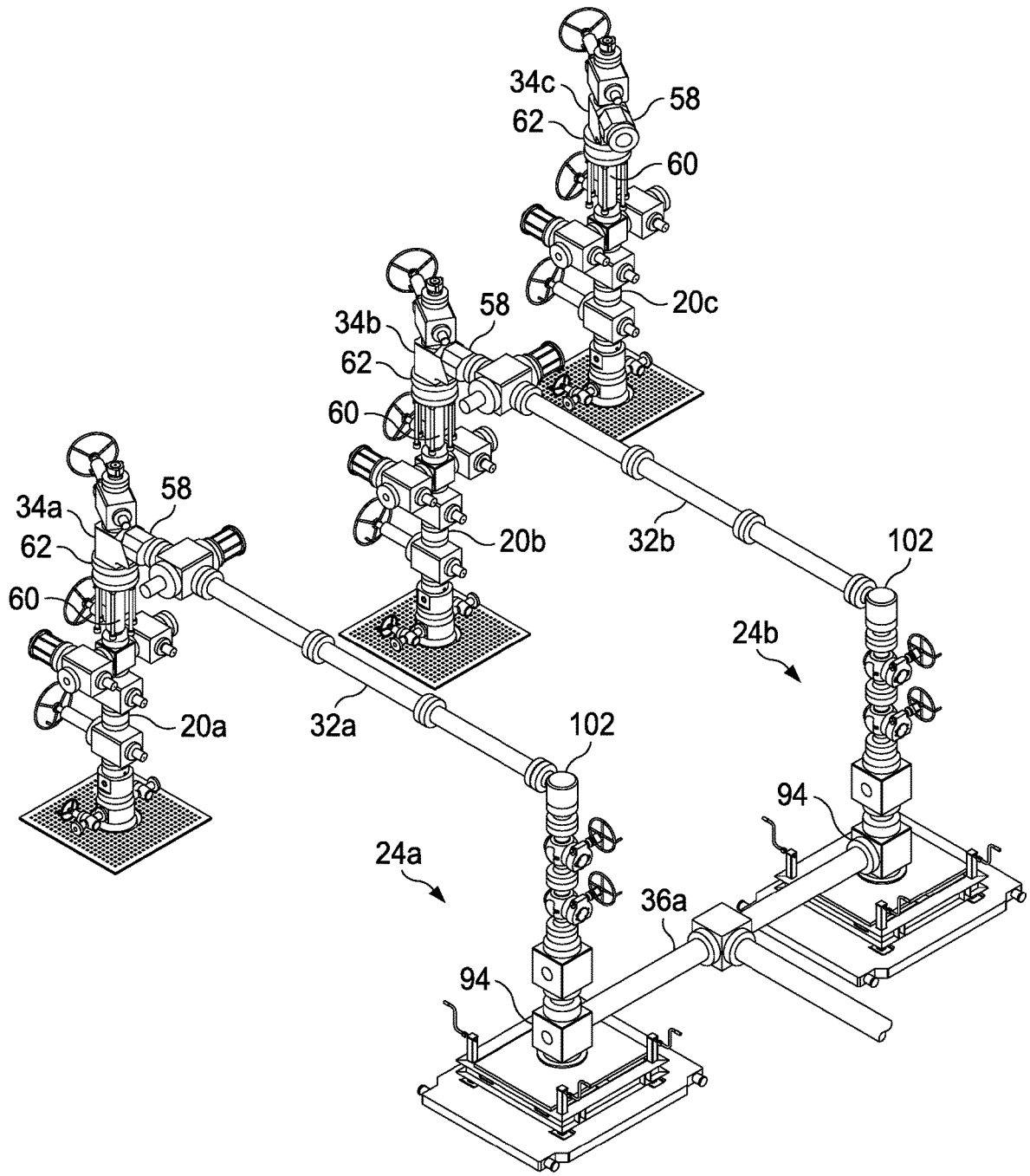

Turning to FIGS. 12 and 13, the lifting mechanism (not shown) is used to place the zipper module 24b on the generally horizontal surface proximate the wellhead 20b. The jacks 118a-d are adjusted to substantially level the base 114 of the zipper module 24b, and to align the lower block 94 of the zipper module 24b with the corresponding lower block 94 of the zipper module 24a, as shown in FIG. 12. Once properly aligned, the fluid conduit 36a is connected between the respective lower blocks 94 of the zipper modules 24a and 24b, as shown in FIG. 12. In addition, the adjustable-length pipe 62 of the frac tree 34b is adjusted (if necessary) to align the block 58 of the frac tree 34b with the block 102 of the zipper module 24b, as shown in FIG. 12. In addition to, or instead of, adjusting the adjustable-length pipe 62 of the frac tree 34b, an adjustable-length pipe (not shown; similar to the adjustable-length pipe 62) incorporated into the zipper tree 89 of the zipper module 24b is adjusted (if necessary) to align the block 102 of the zipper module 24b with the block 58 of the frac tree 34b. Once properly aligned, the respective blocks 58 and 102 of the frac tree 34b and the zipper module 24b are rotated to face each other so that the fluid conduit 32b may be connected therebetween, as shown in FIG. 13.

Figure 14:
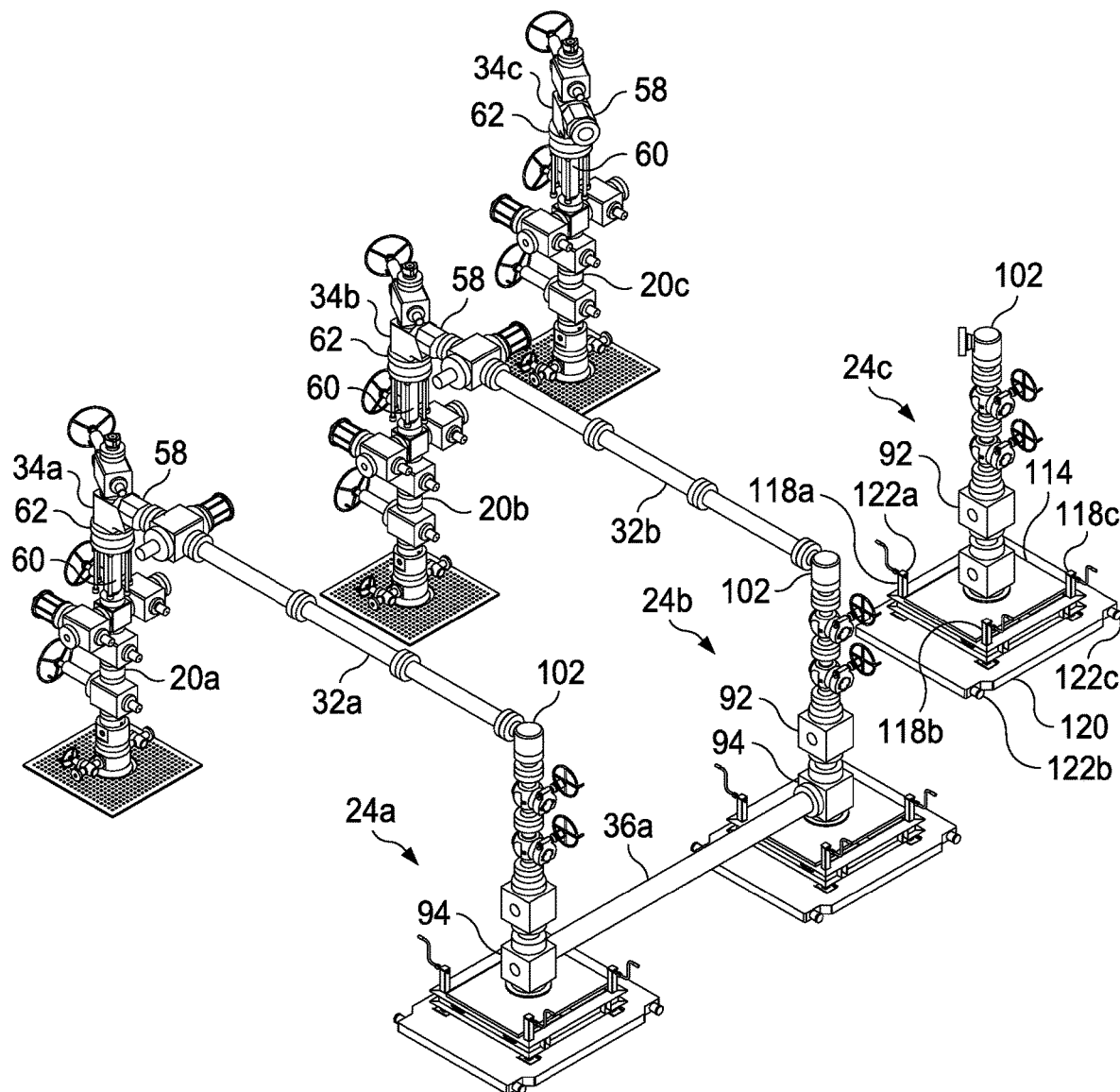
Figure 15:
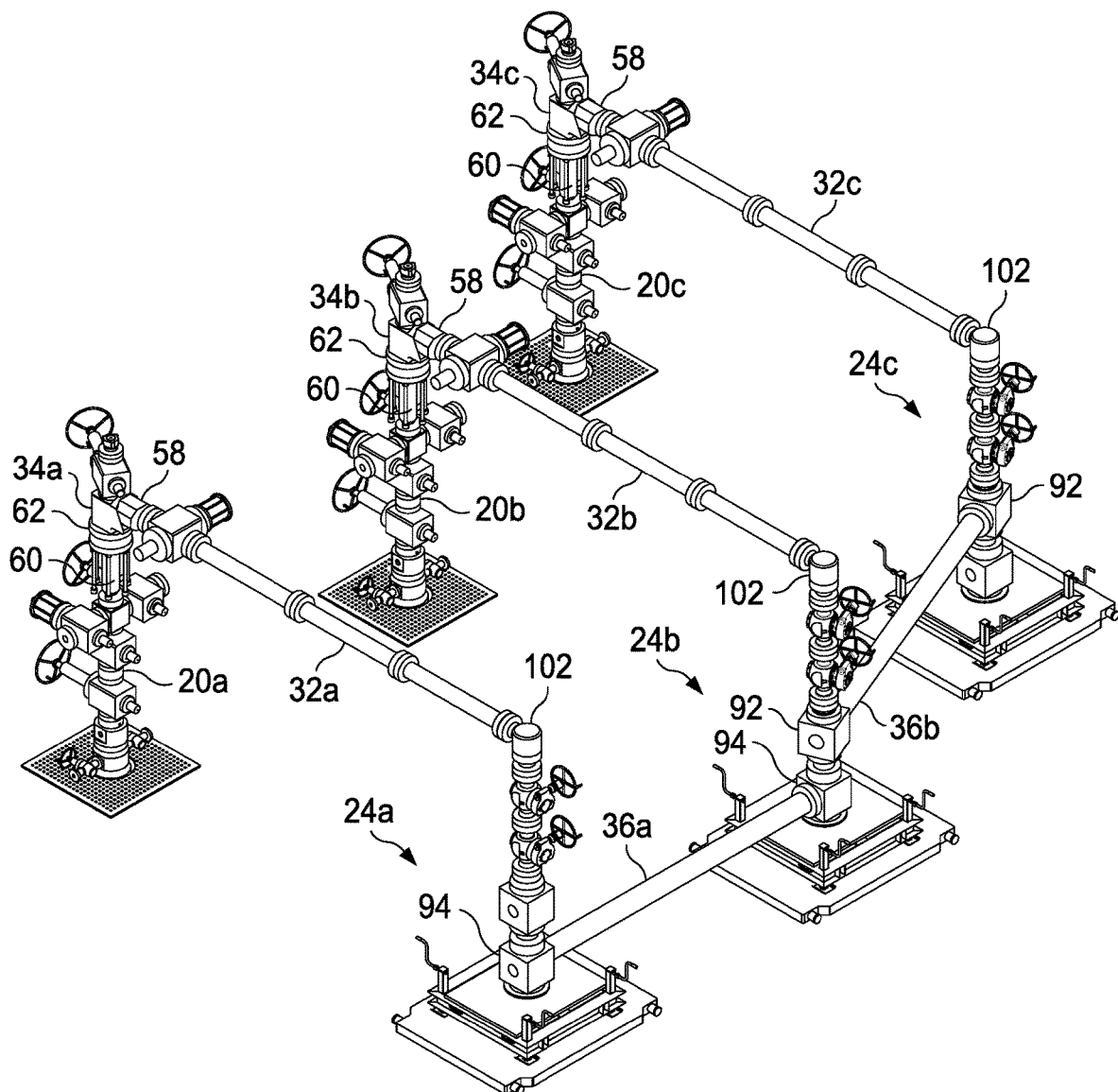

Turning to FIGS. 14 and 15, the lifting mechanism (not shown) is used to place the zipper module 24c on the generally horizontal surface proximate the wellhead 20c. The jacks 118a-d are adjusted to substantially level the base 114 of the zipper module 24c, and to align the upper block 92 of the zipper module 24c with the corresponding upper block 92 of the zipper module 24b, as shown in FIG. 14. Once properly aligned, the respective upper blocks 92 of the zipper modules 24b and 24c are rotated to face each other so that the fluid conduit 36b may be connected therebetween, as shown in FIG. 15. In some embodiments, the respective upper blocks 92 of the zipper modules 24b and 24c are rotated to face each other by: rotating the upper block 92 of the zipper module 24b relative to the lower block 94 (which is connected via the fluid conduit 36a to the corresponding lower block 94 of the zipper module 24a) and the block 102 (which is connected via the fluid conduit 32b to the block 58 of the frac tree 34b) so that said upper block 92 faces the corresponding upper block 92 of the zipper module 24c; and rotating the upper block 92 of the zipper module 24c relative to the lower block 94 and the block 102 so that said upper block 92 faces the corresponding upper block 92 of the zipper module 24c.

In addition, the adjustable-length pipe 62 of the frac tree 34c is adjusted (if necessary) to align the block 58 of the frac tree 34c with the block 102 of the zipper module 24c, as shown in FIG. 14. In addition to, or instead of, adjusting the adjustable-length pipe 62 of the frac tree 34c, an adjustable-length pipe (not shown; similar to the adjustable-length pipe 62) incorporated into the zipper tree 89 of the zipper module 24c is adjusted (if necessary) to align the block 102 of the zipper module 24c with the block 58 of the frac tree 34c. Once properly aligned, the respective blocks 58 and 102 of the frac tree 34c and the zipper module 24c are rotated to face each other so that the fluid conduit 32c may be connected therebetween, as shown in FIG. 15.

In some embodiments, the transport skid 120 is omitted from the zipper modules 24a-c and the lifting mechanism (not shown) is instead connected to the adjustable skid 90 to thereby suspend the zipper module 24a, 24b, or 24c above the horizontal surface proximate the wellhead 20a, 20b, or 20c. During this suspension of the zipper module 24a, 24b, or 24c above the horizontal surface proximate the wellhead 20a, 20b, or 20c, the adjustable-length pipe 62 of the corresponding frac tree 34a, 34b, or 34c is adjusted (if necessary) to align the respective blocks 58 and 102. The fluid conduit 32a, 32b, or 32c (and/or the fluid conduit 36a or 36b) may then be connected in a manner similar to that described above. Finally, the jacks 118a-d are lowered to support the base 114 of the zipper module 24a, 24b, or 24c.

During the above-described connection of the zipper modules 24a-c to each other (via the fluid conduits 36a and 36b) and the respective wellheads 20a-c (via respective pairs of the fluid conduits 32a-c and frac trees 34a-c), the upper and lower blocks 92 and 94 of the respective zipper modules 24a-c are configured to accommodate the different spacings and offsets between the wellheads 20a-c, as represented in FIG. 9 by the distances D1, D2, and D3. In some embodiments, the different spacings and offsets between the wellheads 20a-c, as represented by the distances D1, D2, and D3, are at least partially accommodated by the circumferential offsets of the respective upper blocks 92 relative to the respective lower blocks 94 of the zipper modules 24a-c. In some embodiments, the different spacings and offsets between the wellheads 20a-c, as represented by the distances D1, D2, and D3, are at least partially accommodated by the circumferential offsets of the respective upper blocks 92 relative to the respective lower gate valves 98 of the zipper modules 24a-c. In some embodiments, the different spacings and offsets between the wellheads 20a-c, as represented by the distances D1, D2, and D3, are at least partially accommodated by at least one of: the circumferential offsets of the respective upper blocks 92 relative to the respective lower blocks 94 of the zipper modules 24a-c; and the circumferential offsets of the respective upper blocks 92 relative to the respective lower gate valves 98 of the zipper modules 24a-c.

In some embodiments, the above-described connections between each of: the frac tree 34a and the zipper module 24a, the frac tree 34b and the zipper module 24b, the frac tree 34c and the zipper module 24c, the zipper modules 24a and 24b, and the zipper modules 24b and 24c, are made in whole or in part using automatic controls. In some embodiments, one or more sensors on the frac trees 34a-c and/or the zipper modules 24a-c are employed to determine necessary physical adjustments, and sensor data is transmitted to an automatic controller which, in turn, automatically effects physical adjustments in the system. In some embodiments, one or more electronic devices (such as position sensors and/or transponders) on the frac trees 34a-c ultimately communicate to one or more automatic controllers signals or data indicating the respective positions of the frac trees 34a-c, and the automatic controller(s) automatically effect physical adjustments to the system such as, for example, adjustments to the relative positions between the zipper modules 24a-c.

Figure 16:
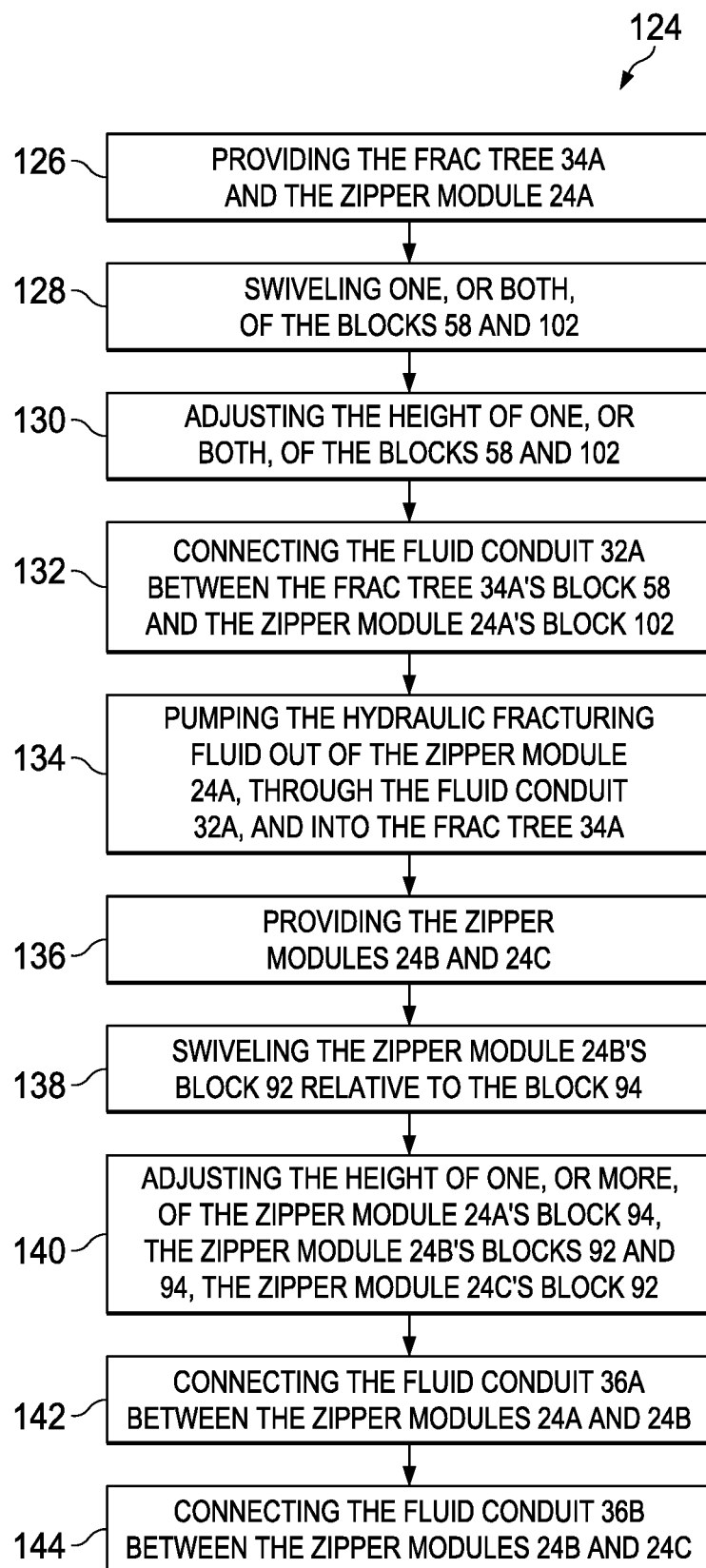
FIG. 16 is a flowchart illustration of a method including steps for completing one or more of the first, second, third, fourth, fifth, and sixth stages of FIG. 15, according to one or more embodiments of the present disclosure.

Turning to FIG. 16, a method is generally referred to by the reference numeral 124 and includes providing the frac tree 34a and the zipper module 24a at a step 126, the fracturing tree including the block 58, and the zipper module 24a including the block 102; swiveling one, or both, of the blocks 58 and 102 at a step 128; adjusting the height of one, or both, of the blocks 58 and 102 at a step 130; connecting the fluid conduit 32a between the frac tree 34a's block 58 and the zipper module 24a's block 102 at a step 132; and pumping the hydraulic fracturing fluid out of the zipper module 24a, through the fluid conduit 32a, and into the frac tree 34a at a step 134. The steps 128 and 130 permit the alignment of the inlet passage 80 of the block 58 and the outlet passage 106 of the block 102 with the straight fluid flow path 81 of the fluid conduit 32a. The step 134 causes the hydraulic fracturing fluid to flow along the straight fluid flow path 81 upon flowing out of the zipper module 24a, and to continue to so flow along the straight fluid flow path 81 until the hydraulic fracturing fluid flows into the frac tree 34a.

In some embodiments, the method 124 further includes providing the zipper modules 24b and 24c at a step 136, the zipper module 24a including the block 94, the zipper module 24b including the blocks 92 and 94, and the zipper module 24c including the block 92; swiveling the zipper module 24b's block 92 relative to the block 94 at a step 138; adjusting the height of one, or more, of the zipper module 24a's block 94, the zipper module 24b's blocks 92 and 94, the zipper module 24c's block 92 at a step 140; connecting the fluid conduit 36a between the zipper modules 24a and 24b at a step 142; and connecting the fluid conduit 36b between the zipper modules 24b and 24c at a step 144. The steps 138 and 140 permit the connection of: the fluid conduit 36a between the respective blocks 94 of the zipper modules 24a and 24b, and the fluid conduit 36b between the respective blocks 92 of the zipper modules 24b and 24c.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A system for supplying fracturing fluid to a first fracturing tree coupled to a first wellhead, the system comprising:
   a first zipper module having:
      a lower block with a first opening configured to receive the fracturing fluid, the lower block being independently rotatable:
         at a first swivel assembly,
         around a vertical axis, and
         relative to a skid configured to support the first zipper module;
      an upper block with a second opening configured to dispel the fracturing fluid, the upper block being independently rotatable:
         at a second swivel assembly,
         around the vertical axis, and
         relative to the lower block;
      a pair of valves connected, in series, between the lower block and the upper block; and
      an internal flow path defined, in series, through the lower block, the pair of valves, and the upper block; and
   a first fluid conduit between the first zipper module and the first fracturing tree, the first fluid conduit comprising at least one pipe, wherein the at least one pipe defines a first straight flow path between the first zipper module and the first fracturing tree.

2. The system of claim 1, wherein the first fracturing tree comprises a third opening coupled to the first fluid conduit and an adjustable-length pipe configured to vertically adjust the third opening between different heights to vertically align the third opening with the second opening of the first zipper module.

3. The system of claim 1, further comprising an adjustable skid supporting the first zipper module, the adjustable skid being vertically movable to raise and lower the first zipper module.

4. The system of claim 3, wherein the adjustable skid comprises one or more jacks configured to vertically move the first zipper module.

5. The system of claim 3, further comprising a transport skid supporting the adjustable skid, the transport skid comprising a plurality of lifting pegs positioned at various corners.

6. The system of claim 1, wherein the first fluid conduit further comprises a gate valve connected to the at least one pipe, and wherein the first straight flow path is further defined through the gate valve.

7. The system of claim 6, wherein the gate valve is actuatable to open and close the first straight flow path in the first fluid conduit.

8. The system of claim 1, wherein the first fluid conduit further comprises a plug valve connected to the at least one pipe, and wherein the first straight flow path is further defined through the plug valve.

9. The system of 1, wherein the at least one pipe is a fixed-length pipe.

10. The system of claim 1, further comprising:
a second zipper module;
a second fracturing tree;
a second fluid conduit configured to supply the fracturing fluid from the first zipper module to the second zipper module; and
a third fluid conduit between the second zipper module and the second fracturing tree, the third fluid conduit comprising at least one pipe connected to the second zipper module, wherein the third fluid conduit defines a second straight flow path between the second zipper module and the second fracturing tree.

11. The system of claim 10, further comprising:
a third zipper module;
a third fracturing tree;
a fourth fluid conduit configured to supply the fracturing fluid from the second zipper module to the third zipper module; and
a fifth fluid conduit between the third zipper module and the third fracturing tree, the fifth fluid conduit comprising at least one pipe connected to the third zipper module, wherein the fifth fluid conduit defines a third straight flow path between the third zipper module and the third fracturing tree.

12. The system of claim 10, further comprising:
a first adjustable skid supporting the first zipper module, the first adjustable skid being vertically movable to raise and lower the first zipper module; and
a second adjustable skid supporting the second zipper module, the second adjustable skid being vertically movable to raise and lower the second zipper module.

13. A zipper module configured to supply fracturing fluid to a first fracturing tree and one or more other zipper modules, the zipper module comprising:
a first lower block with a first opening configured to receive the fracturing fluid, the first lower block defining a first fluid passage along a vertical axis;
a second lower block, positioned along the vertical axis above or below the first lower block, the second lower block defining a second fluid passage along the vertical axis, the second lower block rotatable at a first swivel assembly around the vertical axis relative to the first lower block, the second lower block comprising a second opening configured to discharge the fracturing fluid toward the one or more other zipper modules; and
an upper block positioned along the vertical axis above the first lower block and the second lower block, the upper block defining a third fluid passage along the vertical axis and having a third opening configured to direct the fracturing fluid through a first fluid conduit toward the first fracturing tree, the upper block being rotatable around the vertical axis at a second swivel assembly;
wherein the first lower block, the second lower block, and the upper block define portions of an internal fluid flow path through the zipper module.

14. The zipper module of claim 13, further comprising at least one valve for opening and closing the internal fluid flow path through the zipper module.

15. The zipper module of claim 13, wherein the first fluid conduit comprises at least two pipes that are connected end-to-end to each other, a first of the at least two pipes being connected to the third opening of the upper block, and the first fluid conduit defining a straight-line flow path between the zipper module and the first fracturing tree.

16. The zipper module of claim 15, wherein the first fluid conduit further comprises a valve connected to both a second of the at least two pipes and to the first fracturing tree, wherein the valve defines at least a portion of the straight-line flow path between the zipper module and the first fracturing tree.

17. A system for supplying fracturing fluid to a wellhead through a zipper module comprising a first upper block with a first opening and at least one lower block with an opening for directing the fracturing fluid, the system comprising:
a fracturing tree defining a vertical fluid flow path to the wellhead, the fracturing tree comprising a second upper block with a second opening that is rotatable into alignment with the first opening in the first upper block of the zipper module;
wherein the fracturing tree comprises an adjustable pipe connected to the second upper block of the fracturing tree, the adjustable pipe configured to vertically move the second upper block into alignment with the first opening in the first upper block of the zipper module; and
a fluid conduit coupled to the second upper block of the fracturing tree and the first upper block of the zipper module, the fluid conduit comprising at least one pipe and at least one valve connected to the at least one pipe, wherein the fluid conduit defines a single straight-line fluid flow path between the zipper module and the fracturing tree; and
wherein the first upper block of the zipper module is rotatable around a vertical axis of the zipper module at a first swivel assembly and the at least one lower block of the zipper module is rotatable around the vertical axis of the zipper module at a second swivel assembly.

18. The system of claim 17, wherein the fracturing tree further comprises:
at least one valve positioned below the adjustable pipe; and
an adapter,
wherein the vertical fluid flow path is coaxially defined through the adjustable pipe, the at least one valve, and the adapter.

* * * * *